US012731280B2

(12) United States Patent
Zhao et al.

(10) Patent No.: US 12,731,280 B2
(45) Date of Patent: Sep. 8, 2026

(54) FACE IMAGE DISPLAYING METHOD, READABLE STORAGE MEDIUM, PROGRAM PRODUCT, AND ELECTRONIC DEVICE

(71) Applicant: Huawei Technologies Co., Ltd., Shenzhen (CN)

(72) Inventors: Lei Zhao, Xi'an (CN); Jialong Zheng, Xi'an (CN); Qiang Zhang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 410 days.

(21) Appl. No.: 18/570,956

(22) PCT Filed: Apr. 20, 2022

(86) PCT No.: PCT/CN2022/087992

§ 371 (c)(1),
(2) Date: Dec. 15, 2023

(87) PCT Pub. No.: WO2022/262408

PCT Pub. Date: Dec. 22, 2022

(65) Prior Publication Data

US 2024/0289976 A1 Aug. 29, 2024

(30) Foreign Application Priority Data

Jun. 18, 2021 (CN) ........................ 202110679625.5

(51) Int. Cl.
*G06T 7/70* (2017.01)
*G06T 7/50* (2017.01)
(Continued)

(52) U.S. Cl.
CPC .................. *G06T 7/70* (2017.01); *G06T 7/50* (2017.01); *G06V 40/161* (2022.01);
(Continued)

(58) Field of Classification Search
CPC ... G06T 7/70; G06T 7/50; G06T 2207/10028; G06T 2207/30201; G06V 40/161;
(Continued)

(56) References Cited

U.S. PATENT DOCUMENTS 9,349,414 B1 * 5/2016 Furment .............. H04N 23/611
10,356,372 B2 * 7/2019 Shen ...................... H04N 7/186
(Continued)

FOREIGN PATENT DOCUMENTS

CN 109726694 A 5/2019
CN 110097677 A 8/2019
(Continued)

*Primary Examiner* — Wesley J Tucker
(74) *Attorney, Agent, or Firm* — Slater Matsil, LLP

(57) ABSTRACT

In accordance with an embodiment, a method includes: obtaining, by a first electronic device, a first face image acquired by the first camera at a first moment, wherein a face in the first face image is at a first position of the first face image; and displaying, by a second electronic device, a second face image, where the second face image is obtained by converting the first face image based on the image mapping relationship, and a position of the face in the second face image is the same as a position of the face in an image acquired by the second camera at the first moment.

20 Claims, 23 Drawing Sheets

(51) Int. Cl.

| | |
|---|---|
| ***G06V 40/16*** | (2022.01) |
| ***G06V 40/60*** | (2022.01) |
| ***G07C 9/25*** | (2020.01) |

(52) U.S. Cl.

CPC ............ *G06V 40/172* (2022.01); *G06V 40/67* (2022.01); *G07C 9/257* (2020.01); *G06T 2207/10028* (2013.01); *G06T 2207/30201* (2013.01)

(58) Field of Classification Search

CPC .... G06V 40/172; G06V 40/67; G06V 10/143; G06V 10/247; G06V 10/74; G06V 10/98; G06V 40/16; G06V 40/166; G07C 9/257; G07C 9/00563; G07C 9/37; H04N 23/64

See application file for complete search history.

(56) References Cited

U.S. PATENT DOCUMENTS

| | | | | |
|---|---|---|---|---|
| 10,579,870 | B2 * | 3/2020 | Jeong | G06V 40/193 |
| 11,423,556 | B2 * | 8/2022 | Yan | G06V 40/168 |
| 2018/0173949 | A1 * | 6/2018 | Jeong | G06V 40/166 |
| 2018/0211461 | A1 | 7/2018 | Xin | |
| 2019/0077372 | A1 * | 3/2019 | Greenberg | B60Q 3/80 |
| 2021/0179117 | A1 | 6/2021 | Glazman et al. | |
| 2022/0245978 | A1 * | 8/2022 | Murata | G06T 7/70 |
| 2024/0045936 | A1 * | 2/2024 | Oomine | G06F 21/32 |
| 2024/0078846 | A1 * | 3/2024 | Chyn | G06V 40/165 |

FOREIGN PATENT DOCUMENTS

| | | | | |
|---|---|---|---|---|
| CN | 209821912 | U | | 12/2019 |
| CN | 110889913 | A | | 3/2020 |
| CN | 112634337 | A | | 4/2021 |
| CN | 115830759 | A | * | 3/2023 |
| CN | 119763162 | A | * | 4/2025 |
| WO | 2015020703 | A1 | | 2/2015 |

* cited by examiner

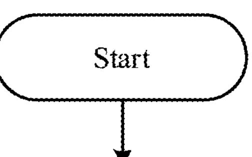

1101

Obtain a mapping relationship (denoted as a "first mapping relationship") between a cat-eye space coordinate system and a TOF space coordinate system, a mapping relationship (denoted as a "second mapping relationship") between the cat-eye space coordinate system and a cat-eye image coordinate system, and a mapping relationship (denoted as a "third mapping relationship") between the TOF space coordinate system and a TOF image coordinate system

1102

Determine a mapping relationship (denoted as a "fourth mapping relationship") between the cat-eye image coordinate system and the TOF image coordinate system based on the obtained first mapping relationship between the cat-eye space coordinate system and the TOF space coordinate system, the obtained second mapping relationship between the cat-eye space coordinate system and the cat-eye image coordinate system, and the obtained third mapping relationship between the TOF space coordinate system and the TOF image coordinate system

1103

Convert, based on the determined mapping relationship between the cat-eye image coordinate system and the TOF image coordinate system, coordinates of pixels in a face image shot by a cat-eye camera 201 into the TOF image coordinate system

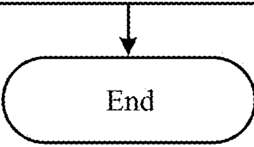

FIG. 11(a)

FACE IMAGE DISPLAYING METHOD, READABLE STORAGE MEDIUM, PROGRAM PRODUCT, AND ELECTRONIC DEVICE

CROSS-REFERENCE TO RELATED APPLICATIONS

This application is a national stage of International Application No. PCT/CN2022/087992, filed on Apr. 20, 2022, which claims priority to Chinese Patent Application No. 202110679625.5, filed on Jun. 18, 2021. Both of the aforementioned applications are hereby incorporated by reference in their entireties.

TECHNICAL FIELD

This application relates to the field of terminal technologies, and in particular, to a face image displaying method, a readable storage medium, a program product, and an electronic device.

BACKGROUND

With the rapid development of artificial intelligence (Artificial Intelligence, AI) technologies, an increasing quantity of electronic devices support a facial recognition function. Usually, to implement the facial recognition function, the electronic device first needs to register a face. In some scenarios, for an electronic device that does not include a display, typically for example, a smart door lock, a user cannot intuitively perceive whether a face is currently within a framing range of a camera of the electronic device, or perceive a position of the face in the framing range of the camera. In some solutions, the electronic device may send an image acquired by the camera to another electronic device including a display for display. However, a position of a face in an image displayed by the another electronic device including the display may be different from a position of the face in an image actually used to register face information, and a current position of the face in the framing range of the camera used to register face information cannot be accurately reflected. Currently, there is no method for the user to intuitively and accurately perceive a position of a face. This causes poor user experience in a face registration process.

SUMMARY

Embodiments of this application provide a face image displaying method, a readable storage medium, a program product, and an electronic device.

In the technical solutions of this application, a face image shot by a first camera as a preview image is converted based on an imaging mapping relationship between the first camera and a second camera of a first electronic device, so that a position of a face in a converted preview image is the same as a position of a face in a face image that is used for facial recognition and that is shot by the second camera at a same moment when the first camera shoots the face image as the preview image. In this way, a preview image displayed by a second electronic device externally connected to the first electronic device can accurately reflect a position, an orientation, and the like of a face in a field of view of the second camera, so that a user can adjust the position, the orientation, and the like of the face in a timely manner by using the preview image displayed by the second electronic device, and the second camera of the first electronic device can quickly capture a valid face image to perform face registration, thereby improving efficiency and accuracy of face registration, and improving user experience.

According to a first aspect, an embodiment of this application provides a face image displaying method, applied to a system including a first electronic device and a second electronic device. The first electronic device includes a first camera and a second camera, and there is an imaging mapping relationship between the first camera and the second camera. The method includes:

a first electronic device obtains a first face image acquired by the first camera at a first moment, where a face in the first face image is at a first position of the first face image; and the second electronic device displays a second face image, where the second face image is an image obtained by converting the first face image based on the imaging mapping relationship, and a position of the face in the second face image is the same as a position of the face in an image acquired by the second camera at the first moment.

The first camera may be a wide-angle camera, for example, a cat-eye camera or a fisheye camera. The second camera may be any one of a TOF camera, a structured light camera, a binocular stereoscopic imaging camera, a depth camera, and an infrared camera. The second camera is configured to acquire depth information of an image.

In addition, the second face image displayed by the second electronic device may be an image obtained after the first electronic device converts the first face image based on the imaging mapping relationship, or may be an image obtained after the second electronic device converts the first face image based on the imaging mapping relationship.

Based on the foregoing imaging mapping relationship, the face image shot by the first camera as the preview image is converted, so that a position of the face in a converted preview image is the same as a position of the face in the face image that is used for facial recognition and that is shot by the second camera at a same moment when the first camera shoots the face image as the preview image. In this way, the preview image displayed by the second electronic device externally connected to the first electronic device can accurately reflect a position, an orientation, and the like of the face in a field of view of the second camera, so that a user can adjust the position, the orientation, and the like of the face in a timely manner by using the preview image displayed by the second electronic device, and the second camera of the first electronic device can quickly capture a valid face image to perform face registration, thereby improving efficiency and accuracy of face registration, and improving user experience.

In a possible implementation of the first aspect, the imaging mapping relationship is a mapping relationship between a first camera image coordinate system and a second camera image coordinate system.

The first camera image coordinate system is a two-dimensional coordinate system associated with the first camera, and the second camera image coordinate system is a two-dimensional coordinate system associated with the second camera.

In a possible implementation of the first aspect, the imaging mapping relationship is a preset parameter; or the imaging mapping relationship is determined by the first electronic device or the second electronic device based on a first mapping relationship, a second mapping relationship, and a third mapping relationship.

The first mapping relationship is a mapping relationship between a first camera space coordinate system and a second camera space coordinate system, the first camera space coordinate system is a three-dimensional coordinate system associated with the first camera, and the second camera space coordinate system is a three-dimensional coordinate system associated with the second camera.

The second mapping relationship is a mapping relationship between the first camera space coordinate system and the first camera image coordinate system.

The third mapping relationship is a mapping relationship between the second camera space coordinate system and the second camera image coordinate system.

In some embodiments, the first camera image coordinate system is a two-dimensional plane rectangular coordinate system associated with the first camera. For example, the first camera is the cat-eye camera, and the first camera image coordinate system is a cat-eye image coordinate system. In this case, the cat-eye image coordinate system is a plane rectangular coordinate system using a central position of a photosensitive chip of the cat-eye camera as an origin of coordinates.

In some embodiments, the second camera image coordinate system is a two-dimensional plane rectangular coordinate system associated with the second camera. For example, the second camera is the TOF camera, and the second camera image coordinate system is a TOF image coordinate system. In this case, the TOF image coordinate system is a plane rectangular coordinate system using a central position of a photosensitive chip of the TOF camera as an origin of coordinates.

In some embodiments, the first camera space coordinate system is a three-dimensional coordinate system associated with the first camera. For example, the first camera is the cat-eye camera, and the first camera space coordinate system is a cat-eye space coordinate system. In this case, the cat-eye space coordinate system is a three-dimensional space coordinate system using a central position of a lens of the cat-eye camera as an origin of coordinates.

In some embodiments, the second camera space coordinate system is a three-dimensional coordinate system associated with the second camera. For example, the second camera is the TOF camera, and the second camera space coordinate system is a TOF space coordinate system. In this case, the TOF space coordinate system is a three-dimensional space coordinate system using a central position of a lens of the TOF camera as an origin of coordinates.

Specifically, for example, it is assumed that a point A is a point in three-dimensional space that appears in fields of view of both the cat-eye camera and the TOF camera. Three-dimensional coordinates of the point A in the cat-eye space coordinate system are (x1, y1, z1), and two-dimensional coordinates of a pixel corresponding to the point A in an image shot by the cat-eye camera are (x2, y2). Three-dimensional coordinates of the point A in the TOF space coordinate system are (x1', y1', z1'), and two-dimensional coordinates of a pixel corresponding to the point A in an image shot by the TOF camera are (x2', y2').

In this case, the first mapping relationship represents a mapping relationship between the three-dimensional coordinates (x1, y1, z1) of the point A in the cat-eye space coordinate system and the three-dimensional coordinates (x1', y1', z1') of the point A in the TOF space coordinate system.

The second mapping relationship represents a mapping relationship between the three-dimensional coordinates (x1, y1, z1) of the point A in the cat-eye space coordinate system and the two-dimensional coordinates (x2, y2) of the pixel corresponding to the point A in the image shot by the cat-eye camera.

The third mapping relationship represents a mapping relationship between the three-dimensional coordinates (x1', y1', z1') of the point A in the TOF space coordinate system and the two-dimensional coordinates (x2', y2') of the pixel corresponding to the point A in the image shot by the TOF camera.

In a possible implementation of the first aspect, the method further includes:

- the second electronic device receives the first face image sent by the first electronic device, and processes the first face image based on the imaging mapping relationship to obtain the second face image; or
- the second electronic device receives the second face image sent by the first electronic device.

In a possible implementation of the first aspect, the first electronic device or the second electronic device obtains the imaging mapping relationship by using an application program associated with the first electronic device.

For example, after the first electronic device establishes a connection to the second electronic device, when the second electronic device is used as an external device of the first electronic device to display the preview image of the face, the first electronic device may send the stored imaging mapping relationship to the second electronic device, or the first electronic device calculates the imaging mapping relationship based on the stored first mapping relationship, second mapping relationship, and third mapping relationship, and then sends the calculated imaging mapping relationship to the second electronic device, so that the second electronic device processes the first face image based on the imaging mapping relationship, to obtain the second face image.

For another example, after the first electronic device establishes a connection to the second electronic device, when the second electronic device is used as an external device of the first electronic device to display the preview image of the face, the first electronic device may process the first face image based on the stored imaging mapping relationship to obtain the second face image, and then send the second face image to the second electronic device. Alternatively, the first electronic device calculates the imaging mapping relationship based on the stored first mapping relationship, second mapping relationship, and third mapping relationship, processes the first face image based on the calculated imaging mapping relationship to obtain the second face image, and then sends the second face image to the second electronic device.

In addition, the first electronic device may further obtain the imaging mapping relationship by downloading and installing an application program associated with the first electronic device, and then sends the obtained mapping relationship to the second electronic device, so that the second electronic device processes the first face image based on the imaging mapping relationship to obtain the second face image. Alternatively, the first electronic device directly processes the first face image based on the obtained imaging mapping relationship to obtain the second face image, and then sends the second face image to the second electronic device.

In addition, the second electronic device may alternatively obtain the imaging mapping relationship by downloading and installing an application program associated with the first electronic device, and then processes the first face image based on the imaging mapping relationship to obtain the second face image.

In a possible implementation of the first aspect, the method further includes:

the second electronic device displays first prompt information for prompting the user to adjust the position of the face.

For example, the second electronic device displays a text prompt such as "Move your face to the left", or "Move your face to the right", to prompt the user to adjust the position of the face.

In a possible implementation of the first aspect, the method further includes:

in the second face image displayed by the second electronic device, when the position of the face is close to a central position of the second face image, the second electronic device skips displaying the first prompt information.

For example, when the position of the face is at the central position of the second face image or the position of the face is within a preset distance around the central position of the second face image, the second electronic device skips displaying the first prompt information.

In a possible implementation of the first aspect, the method further includes:

the second electronic device displays second prompt information for prompting the user to adjust an orientation of the face.

For example, when the second electronic device determines that the face is at the central position or near the central position of the preview image, a text prompt such as "Raise your head", "Lower your head", "Turn your face to the right", or "Turn your face to the left" is displayed.

In a possible implementation of the first aspect, the first prompt information and/or the second prompt information are/is generated based on the second face image.

In a possible implementation of the first aspect, a field of view of the first camera is greater than a field of view of the second camera.

In a possible implementation of the first aspect, the first camera is either of the cat-eye camera and the fisheye camera. The second camera is any one of the TOF camera, the structured light camera, the binocular stereoscopic imaging camera, the depth camera, and the infrared camera. The second camera is configured to acquire depth information of an image.

In a possible implementation of the first aspect, the first electronic device is a smart door lock, and the second electronic device is a mobile phone.

The first electronic device may be any electronic device that supports a facial recognition function and that does not have a display, including but not limited to a smart door lock, a robot, a security protection device, and the like.

In addition, the second electronic device may be one of various portable terminal devices that have a displaying function and an image processing function. For example, in addition to the mobile phone, the second electronic device may be one of various portable terminal devices such as a band, a watch, and a tablet computer.

According to a second aspect, an embodiment of this application provides a face image displaying method, applied to a second electronic device. The method includes:

displaying a second face image, where the second face image is an image obtained by converting a first face image based on an imaging mapping relationship, the imaging mapping relationship is a mapping relationship between an image acquired by a first camera and an image acquired by a second camera, the first camera and the second camera are included in a first electronic device different from the second electronic device, the first face image is an image acquired by the first camera at a first moment, a face in the first face image is at a first position of the first face image, and a position of the face in the second face image is the same as a position of the face in an image acquired by the second camera at the first moment.

In a possible implementation of the second aspect, the imaging mapping relationship is a mapping relationship between a first camera image coordinate system and a second camera image coordinate system.

The first camera image coordinate system is a two-dimensional coordinate system associated with the first camera, and the second camera image coordinate system is a two-dimensional coordinate system associated with the second camera.

In a possible implementation of the second aspect, the imaging mapping relationship is a preset parameter; or the imaging mapping relationship is determined by the second electronic device based on a first mapping relationship, a second mapping relationship, and a third mapping relationship.

The first mapping relationship is a mapping relationship between a first camera space coordinate system and a second camera space coordinate system, the first camera space coordinate system is a three-dimensional coordinate system associated with the first camera, and the second camera space coordinate system is a three-dimensional coordinate system associated with the second camera.

The second mapping relationship is a mapping relationship between the first camera space coordinate system and the first camera image coordinate system.

The third mapping relationship is a mapping relationship between the second camera space coordinate system and the second camera image coordinate system.

In a possible implementation of the second aspect, the method further includes: receiving the first face image sent by the first electronic device, and processing the first face image based on the imaging mapping relationship to obtain the second face image; or receiving the second face image sent by the first electronic device.

In a possible implementation of the second aspect, the second electronic device obtains the imaging mapping relationship by using an application program associated with the first electronic device.

In a possible implementation of the second aspect, the method further includes: displaying first prompt information for prompting a user to adjust a position of the face.

In a possible implementation of the second aspect, the method further includes:

in the displayed second face image, when the position of the face is close to a central position of the second face image, the second electronic device skips displaying the first prompt information.

In a possible implementation of the second aspect, the method further includes:

displaying second prompt information for prompting the user to adjust an orientation of the face.

In a possible implementation of the second aspect, the first prompt information and/or the second prompt information are/is generated based on the second face image.

In a possible implementation of the second aspect, a field of view of the first camera is greater than a field of view of the second camera.

In a possible implementation of the second aspect, the first camera is either of a cat-eye camera and a fisheye camera. The second camera is any one of a TOF camera, a structured light camera, a binocular stereoscopic imaging camera, a depth camera, and an infrared camera. The second camera is configured to acquire depth information of an image.

In a possible implementation of the second aspect, the second electronic device is a mobile phone.

According to a third aspect, an embodiment of this application provides a face image displaying method, applied to a first electronic device. The first electronic device includes a first camera and a second camera, and there is an imaging mapping relationship between the first camera and the second camera. The method includes:

obtaining a first face image acquired by the first camera at a first moment, where a face in the first face image is at a first position of the first face image, the first face image is used to obtain a second face image through conversion based on the imaging mapping relationship, a position of the face in the second face image is the same as a position of the face in an image acquired by the second camera at the first moment, and the second face image is used to be displayed in a second electronic device different from the first electronic device.

In a possible implementation of the third aspect, the imaging mapping relationship is a mapping relationship between a first camera image coordinate system and a second camera image coordinate system.

The first camera image coordinate system is a two-dimensional coordinate system associated with the first camera, and the second camera image coordinate system is a two-dimensional coordinate system associated with the second camera.

In a possible implementation of the third aspect, the imaging mapping relationship is a preset parameter; or the imaging mapping relationship is determined by the first electronic device based on a first mapping relationship, a second mapping relationship, and a third mapping relationship.

The first mapping relationship is a mapping relationship between a first camera space coordinate system and a second camera space coordinate system, the first camera space coordinate system is a three-dimensional coordinate system associated with the first camera, and the second camera space coordinate system is a three-dimensional coordinate system associated with the second camera.

The second mapping relationship is a mapping relationship between the first camera space coordinate system and the first camera image coordinate system.

The third mapping relationship is a mapping relationship between the second camera space coordinate system and the second camera image coordinate system.

In a possible implementation of the third aspect, the first electronic device obtains the imaging mapping relationship by using an application program associated with the first electronic device.

In a possible implementation of the third aspect, a field of view of the first camera is greater than a field of view of the second camera.

In a possible implementation of the third aspect, the first camera is either of a cat-eye camera and a fisheye camera. The second camera is any one of a TOF camera, a structured light camera, a binocular stereoscopic imaging camera, a depth camera, and an infrared camera. The second camera is configured to acquire depth information of an image.

In a possible implementation of the third aspect, the first electronic device is a smart door lock.

According to a fourth aspect, an embodiment of this application provides a computer-readable storage medium. The computer-readable storage medium stores instructions. When the instructions are executed on an electronic device, the electronic device is enabled to perform the method according to any one of the second aspect and the possible implementations of the second aspect, or perform the method according to any one of the third aspect and the possible implementations of the third aspect.

According to a fifth aspect, an embodiment of this application provides a computer program product. The computer program product includes instructions. The instructions are used to implement the method according to any one of the second aspect and the possible implementations of the second aspect, or are used to implement the method according to any one of the third aspect and the possible implementations of the third aspect.

According to a sixth aspect, an embodiment of this application provides a chip apparatus. The chip apparatus includes:

a communication interface, configured to input and/or output information; and a processor, configured to execute a computer executable program, so that a device installed with the chip apparatus performs the method according to any one of the second aspect and the possible implementations of the second aspect, or performs the method according to any one of the third aspect and the possible implementations of the third aspect.

According to a seventh aspect, an embodiment of this application provides an electronic device, including:

a memory, configured to store instructions executed by one or more processors of the electronic device; and a processor, where when the instructions are executed by one or more processors, the processor is configured to perform the method according to any one of the second aspect and the possible implementations of the second aspect, or perform the method according to any one of the third aspect and the possible implementations of the third aspect.

BRIEF DESCRIPTION OF THE DRAWINGS

FIG. 11(*b*) shows another processing procedure in which a mobile phone maps a face image that is shot by a cat-eye camera and that is received from a smart door lock to a TOF camera coordinate system, according to some embodiments of this application;

DETAILED DESCRIPTION OF EMBODIMENTS

Figure 1:
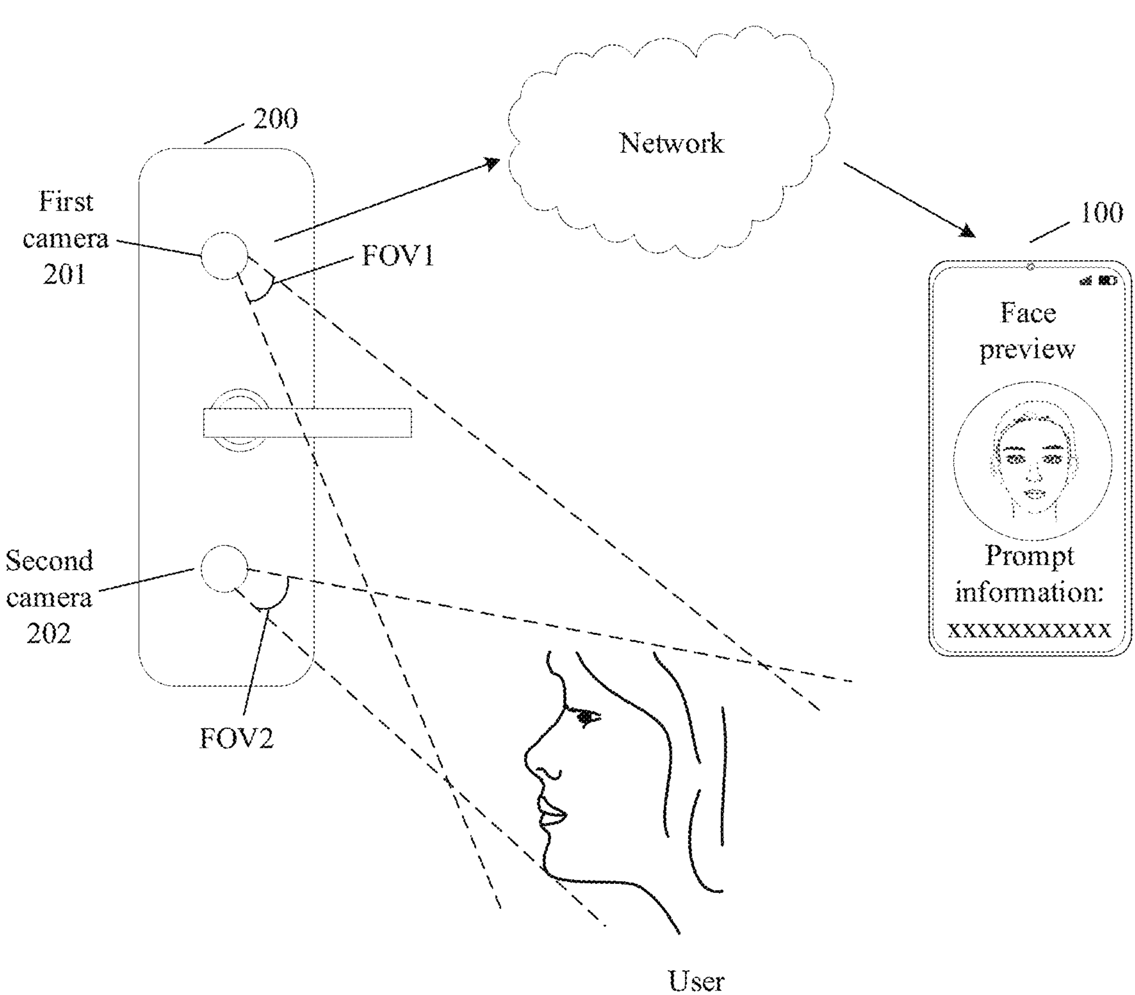
FIG. 1 is a diagram of a usage scenario of a smart door lock with facial recognition according to some embodiments of this application.

Illustrative embodiments of this application include but are not limited to a face image displaying method, a readable storage medium, a program product, and an electronic device.

For a better understanding of the technical solutions in embodiments of this application, the following first describes related terms and concepts that may be used in embodiments of this application.

A TOF camera is a camera that uses a time-of-flight (Time-of-Flight, TOF) technology. The TOF camera has a relatively narrow field of view, and can obtain depth information in an image when shooting the image. Even though a photosensitive chip of the TOF camera finally obtains a two-dimensional image through imaging, because depth information of each image element in the image may be obtained when the TOF camera shoots the image, the image shot by the TOF camera is usually referred to as a three-dimensional (Three Dimensions, 3D) image.

The image shot by the TOF camera is a black-and-white image. In addition, according to relevant regulations, an original black-and-white image shot by the TOF camera as a biometric password of a human body is not allowed to be sent, by using a network, to another device different from a device or an apparatus in which the TOF camera is located. That is, the original black-and-white image can only be processed and stored locally.

An image shot by a cat-eye camera is a two-dimensional color image. In addition, the cat-eye camera has a relatively wide field of view, and a shot image has relatively large distortion.

The following further describes embodiments of this application in detail with reference to the accompanying drawings.

With the development of intelligent terminal technologies, intelligent terminal devices have increasingly wide application. Typically, for a smart door lock, a user does not need to use a conventional key to unlock a door, and may directly unlock the door by using an app on a mobile phone, facial recognition, fingerprint recognition, or the like. An operation manner is simple and intelligent. In addition, because the smart door lock has better anti-theft performance, the smart door lock has more and more application in the home or production field. For a smart door lock that supports a facial recognition function, due to costs of the smart door lock and aesthetic pursuit of an appearance of the smart door lock, a display is usually not disposed on the smart door lock, and a manner such as voice or light is used to prompt the user to adjust a position of a face. Although voice and light can assist the user in adjusting the position of the face, the user cannot intuitively view the position of the face of the user, resulting in poor user experience.

To improve user experience in a process of using the smart door lock, an electronic device externally connected to the smart door lock is usually used to display in real time a schematic diagram of a face or a simulated face image, rather than a real face image, which also affects user experience.

The following describes the technical solutions of this application in detail by using an application scenario of a smart door lock as an example. It may be understood that the technical solutions of this application may be applied to any electronic device that supports a facial recognition function and that does not have a display, including but not limited to a smart door lock, a robot, a security protection device, and the like.

FIG. 1 is a diagram of a usage scenario of a smart door lock with facial recognition according to some embodiments of this application. An electronic device 100 and a smart door lock 200 are included. The smart door lock 200 includes a first camera 201 and a second camera 202.

The first camera 201 is configured to acquire a 2D image that does not include depth information. The 2D image does not include a biometric password of a user, and may be sent by the smart door lock 200 to another external electronic device, and is processed and then displayed as a preview image by the another electronic device. For example, the user may remotely monitor a situation outside the home by using the another electronic device. In addition, when the user is indoors, the user may further check a situation outside the door by using the first camera 201. For example, the user checks, by using the first camera 201, who knocks outside the door, or checks whether a stranger stays outside the door. To meet a monitoring requirement, an image shot by the first camera 201 needs to cover as wide a range as possible. Therefore, the first camera 201 is usually a camera with a relatively wide field of view, for example, a cat-eye camera or a fisheye camera.

The second camera 202 is configured to acquire a 3D image including the depth information. The 3D image includes the biometric password of the user. Therefore, the image shot by the second camera 202 is usually not allowed to be sent to the outside, and can only be processed and stored locally by the smart door lock 200, to prevent leakage of user privacy. In addition, when the 3D image including the depth information is used to perform facial recognition, a more accurate facial feature may be extracted from the 3D image, which helps improve accuracy of facial recognition. Therefore, to meet a requirement for accuracy of facial recognition, the smart door lock 200 usually needs to be installed with the second camera 202. The second camera 202 is a camera with a relatively narrow field of view, for example, a TOF camera, a structured light camera, a binocular stereoscopic imaging camera, a depth camera, or an infrared camera.

In addition, a smart door lock application is installed on the electronic device 100. When face registration needs to be performed, the user aligns the face with the first camera 201 and the second camera 202, and holds the electronic device 100 at the same time. The user operates the smart door lock application installed on the electronic device 100, so that the electronic device 100 and the smart door lock 200 are paired and connected. For example, the electronic device 100 is paired and connected to the smart door lock 200 in a communication manner such as wireless fidelity (Wireless-Fidelity, Wi-Fi), Bluetooth (Bluetooth, BT), or near field communication (Near Field Communication, NFC). After the electronic device 100 is successfully connected to the smart door lock 200, the electronic device 100 initiates a face image registering procedure to the smart door lock 200 in response to an operation of the user.

In a process of registering a face image, the smart door lock 200 and the electronic device 100 perform a face registration method provided in this application, and the first camera 201 and the second camera 202 of the smart door lock 200 separately shoot an image of the face of the user. Then, the smart door lock 200 sends a face image shot by the first camera 201 to the electronic device 100 for face preview. The smart door lock 200 performs feature extraction on a face image shot by the second camera 202, evaluates image quality, and recognizes a face in the image.

The first camera 201 configured to shoot a preview image is usually further configured to shoot a surveillance image around the smart door lock 200. Therefore, to monitor an environment around the smart door lock 200 in a relatively wide range, a field of view FOV1 of the first camera 201 is usually relatively wide, so that the image shot by the first camera 201 has relatively large distortion.

However, to effectively implement a facial recognition function of the smart door lock 200, the image shot by the second camera 202 for facial recognition is required to have relatively small distortion, and a proportion of the face in the image is required to be relatively high. In addition, to obtain as much information as possible about the face of the user, the second camera 202 is required to obtain depth information of the face of the user. Therefore, the second camera 202 is required to have a relatively narrow field of view FOV2, and the second camera 202 is required to have a function of obtaining the depth information of the face of the user. In addition, because the second camera 202 can obtain the depth information of the face of the user that is used as the biometric password of the human body, it is usually not allowed to send, by using the network, the image shot by the second camera 202 to another device different from the smart door lock 200. That is, the image can only be processed and stored locally in the smart door lock 200.

Figures 2A, 2B, 2C:
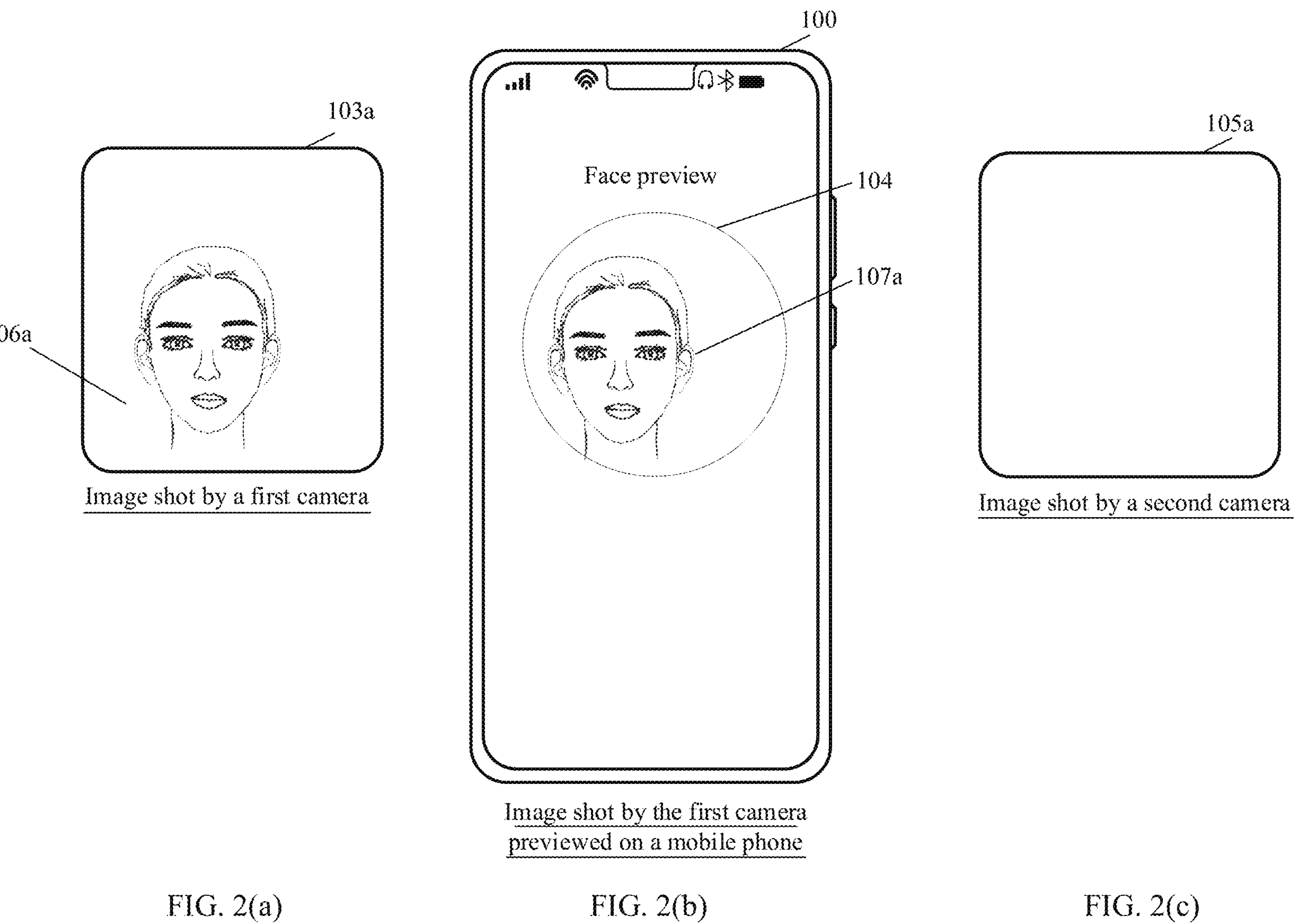
FIG. 2(*a*) to FIG. 2(*f*) show cases in which a position of a face on a preview interface displayed by an electronic device is inconsistent with a position of a face in a face image shot in a smart door lock for facial recognition in some embodiments.
Figures 2D, 2E, 2F:
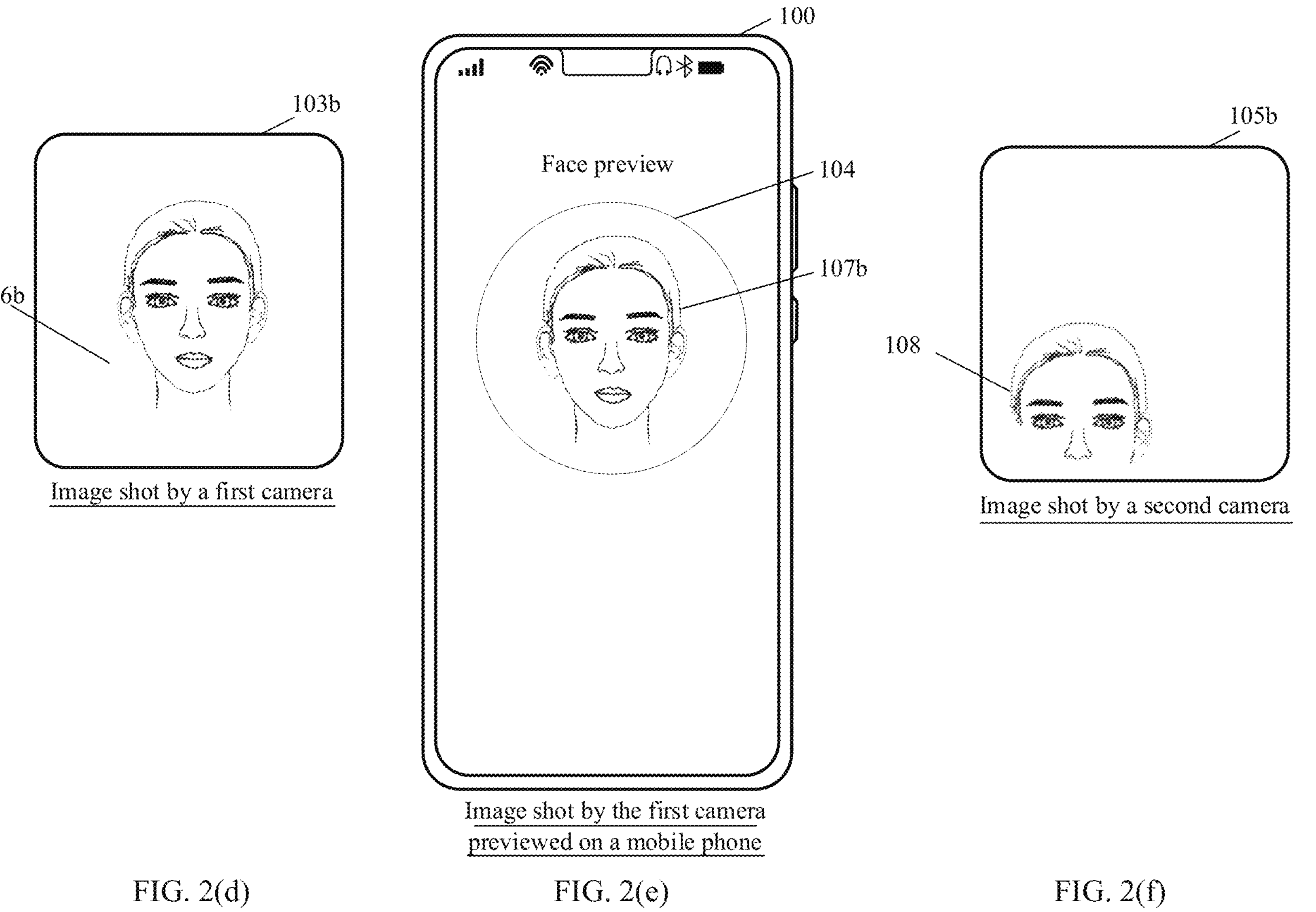

It may be understood that, based on different installation positions and different fields of view of the first camera 201 and the second camera 202, in a face registration process, a position of the face of the user in a field of view of the first camera 201 is different from a position of the face in a field of view of the second camera 202. As described above, the smart door lock 200 can send, by using the network, the image shot by the first camera 201 to the electronic device 100, but cannot send, by using the network, the image shot by the second camera 202 to the electronic device 100. Therefore, the electronic device 100 can obtain an image that is to be displayed as a preview image for face registration, and the image is the image shot by the first camera 201. Therefore, the position of the face in the preview image displayed by the electronic device 100 is different from the position of the face in the image shot by the second camera 202 for facial recognition. For example, the face of the user appears in the field of view of the first camera 201, but does not appear in the field of view of the second camera 202. Specifically, for example, in an embodiment shown in FIG. 2(*a*), an image 103*a* shot by the first camera 201 includes a face 106*a*, and the face 106*a* is at a position on a lower left side of the image 103*a*. Similarly, a preview image 104 displayed on a face preview interface of the electronic device 100 shown in FIG. 2(*b*) also includes a face 107*a*. Because the preview image 104 comes from the image shot by the first camera 201, the face 107*a* is also at a position on a lower left side of the preview image 104. However, because installation positions and fields of view of the first camera 201 and the second camera 202 are different, when the image shot by the first camera 201 includes the face, the image shot by the second camera 202 may not include the face. For example, an image 105*a* shot by the second camera 202 shown in FIG. 2(*c*) does not include the face. That is, the second camera 202 does not shoot an image of facial features of the user. Therefore, when the smart door lock 200 performs feature extraction on an image that is shot by the second camera 202 and that does not include the facial features of the user, the facial features of the user cannot be extracted. As a result, face registration fails.

For another example, even if the face of the user appears in the fields of view of both the first camera 201 and the second camera 202, the face of the user is at a center of the field of view of the first camera 201, and is located at an edge of the field of view of the second camera 202. As a result, the second camera 202 cannot shoot an image of all the facial features of the user. For example, in an embodiment shown in FIG. 2(*d*), a face 106*b* in an image 103*b* shot by the first camera 201 is at a central position of the image 103*b*. Similarly, a face 107*b* in a preview image 104 displayed on a face preview interface of the electronic device 100 shown in FIG. 2(*e*) is also at a central position of the preview image 104. However, in an image 105*b* shot by the second camera 202 shown in FIG. 2(*f*), a face 108 is at an edge position of the image 105*b*, and the face 108 in the image 105*b* does not include a mouth of the user. That is, the second camera 202 does not shoot an image of all the facial features of the user. Therefore, when the smart door lock 200 performs feature extraction on the image that is shot by the second camera 202 and that does not include all the facial features, all the facial features of the user cannot be extracted. As a result, face registration fails.

Figure 3:
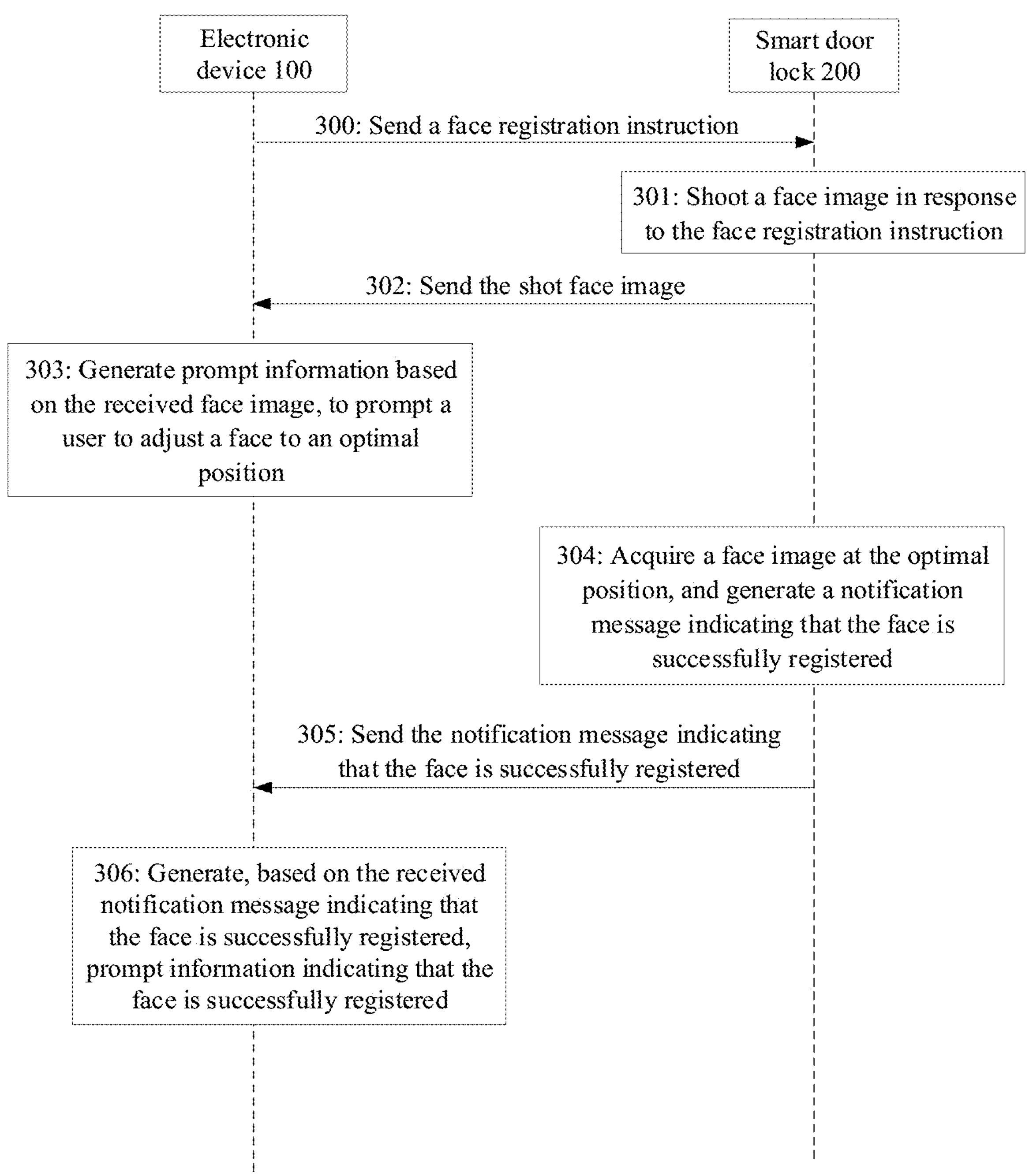
FIG. 3 is a flowchart of prompting, by an electronic device, a user to adjust a position of a face by using voice, text, or a simulated picture of a face in some embodiments.
Figure 4B:
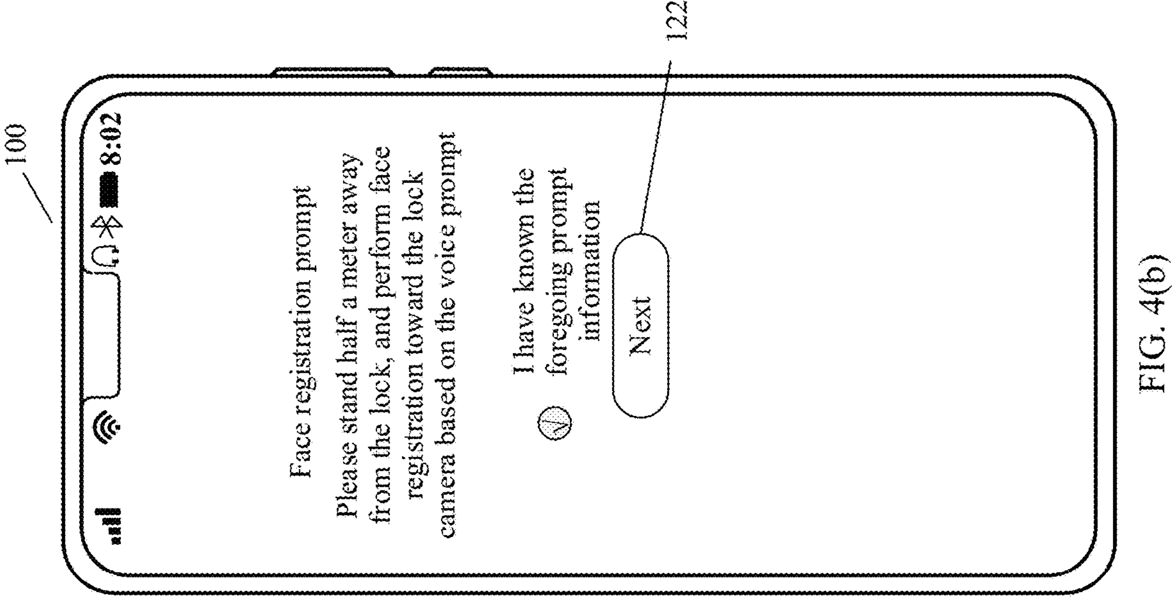
FIG. 4(*a*) to FIG. 4(*i*) are diagrams of some user interfaces in which an electronic device prompts a user to adjust a position of a face in the technical solution shown in FIG. 3 according to some embodiments of this application.
Figure 4A:
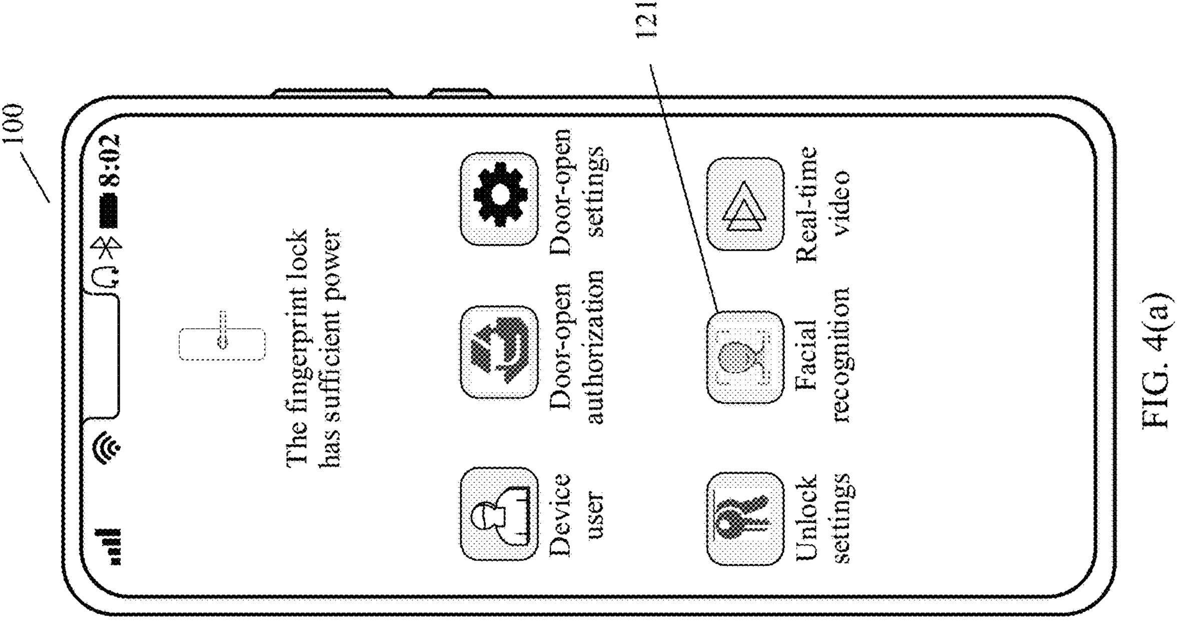
Figure 4D:
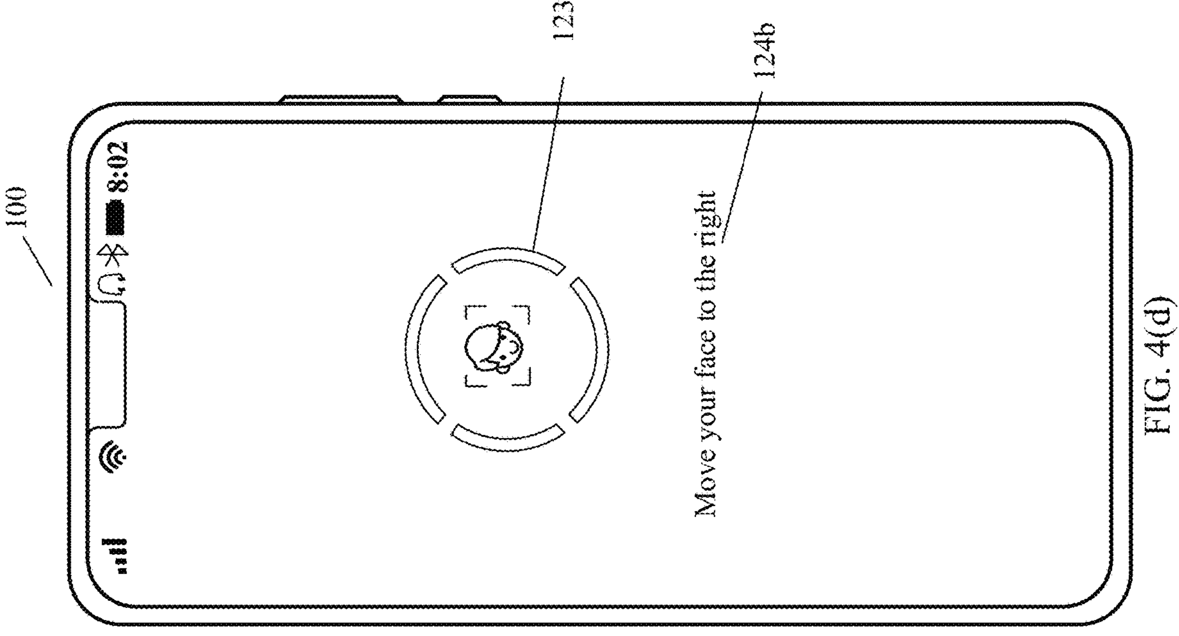
Figure 4C:
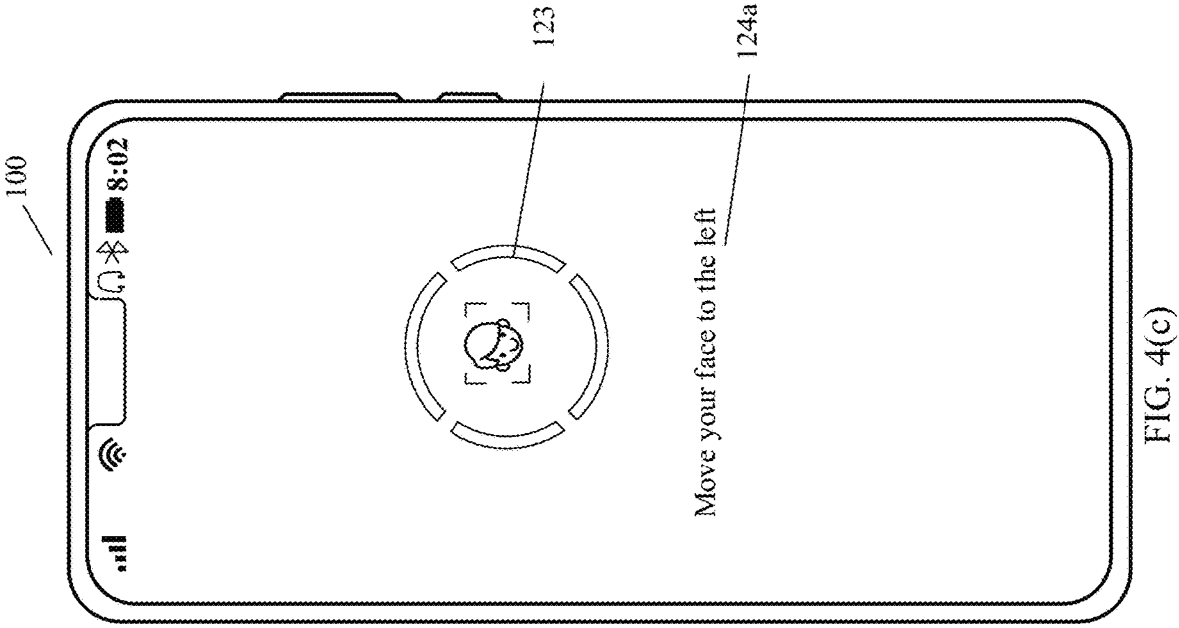
Figure 4F:
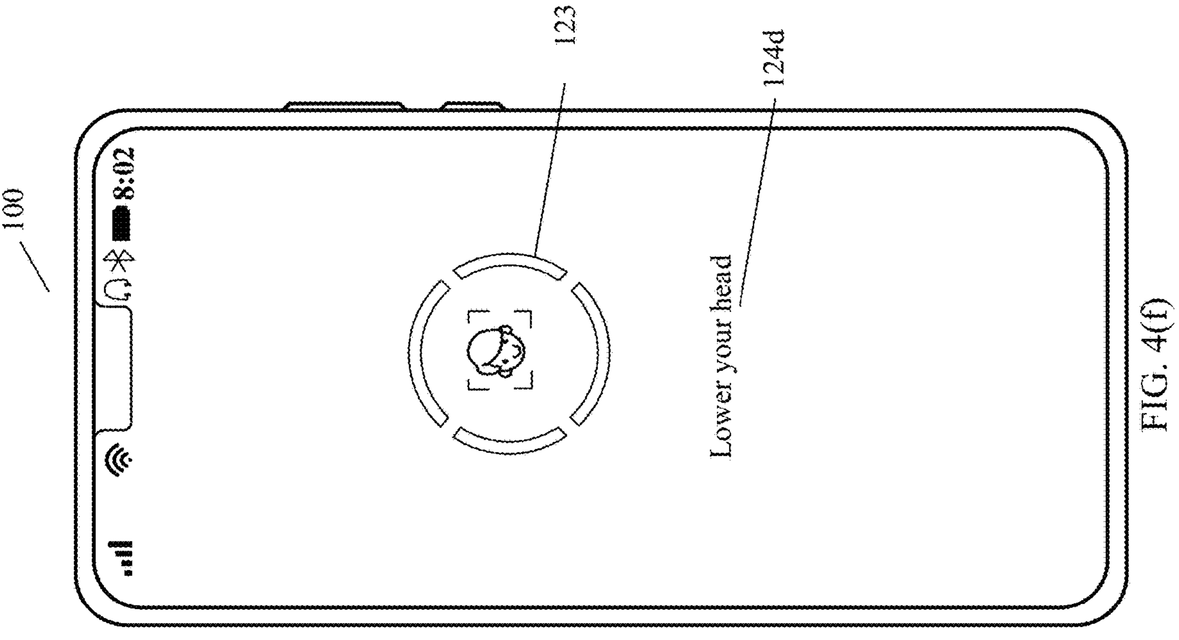
Figure 4E:
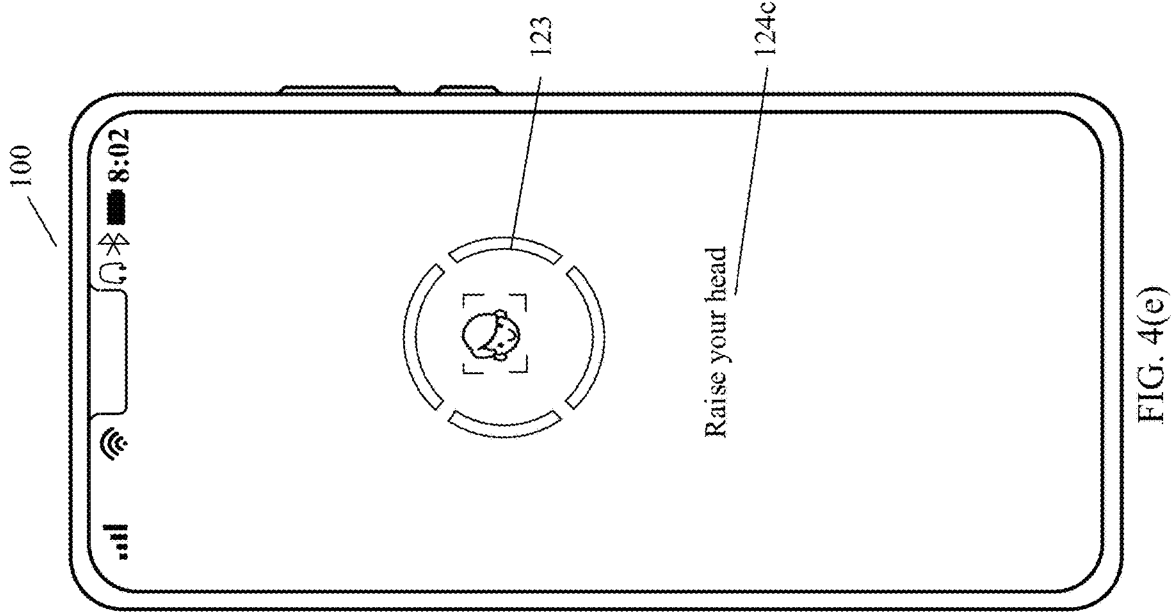
Figures 4G, 4H:
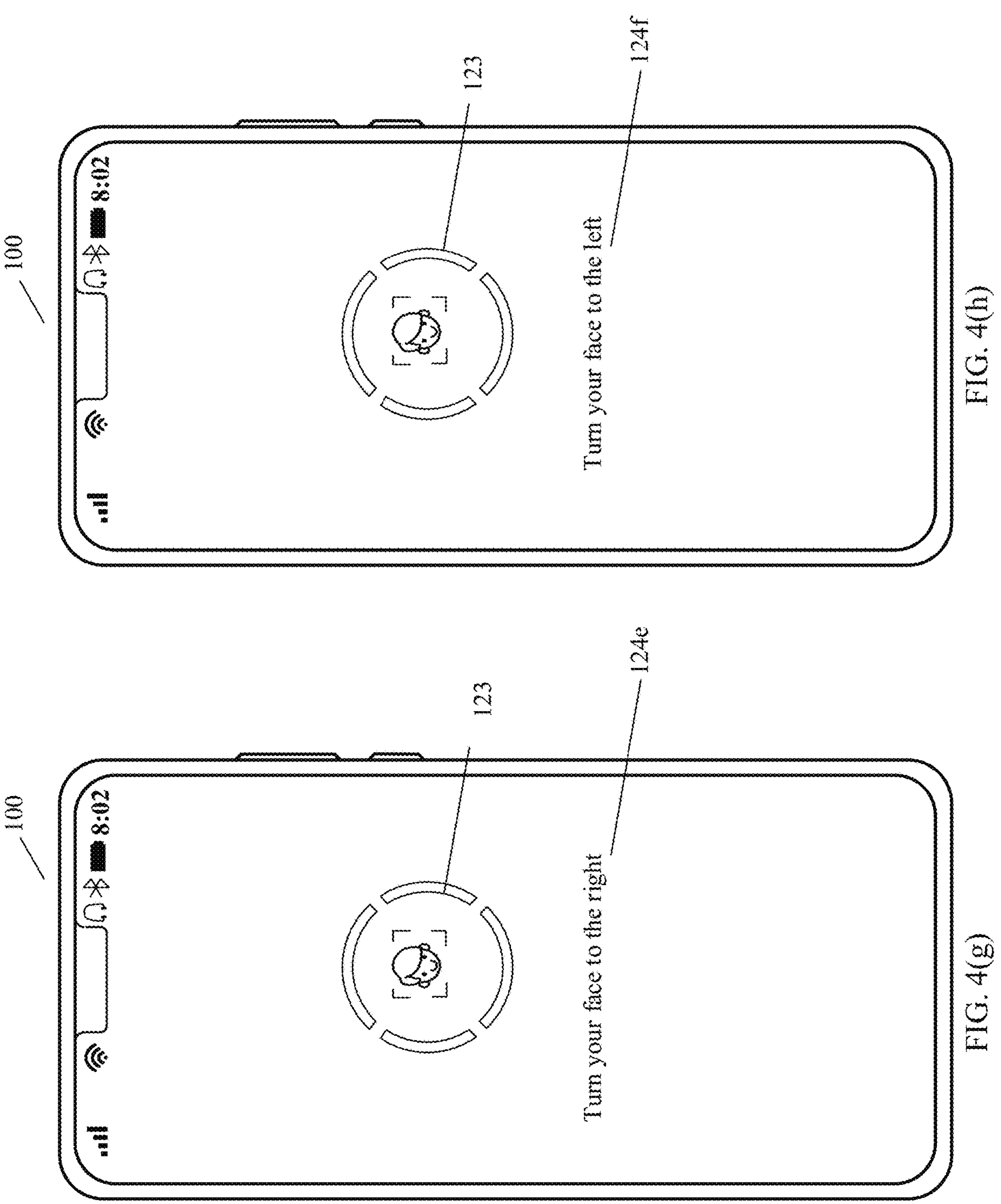
Figure 4I:
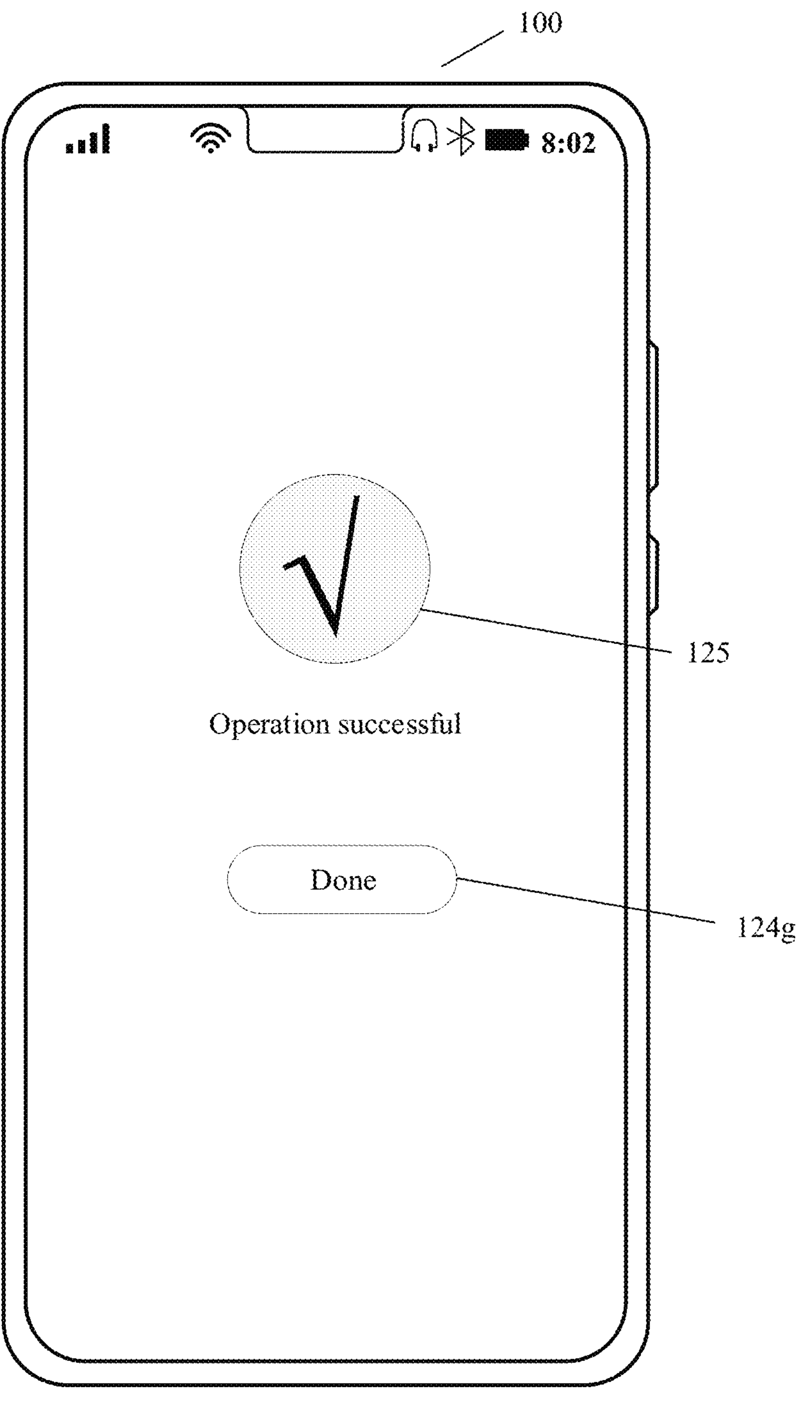

In some smart door lock technologies, to remind the user in real time to adjust the face to a shooting range of the second camera 202, the smart door lock 200 implements, through step 300 to step 306 shown in FIG. 3, that the external electronic device 100 generates voice, text, or a picture to remind the user to adjust the position of the face. Specifically, as shown in FIG. 3, the following steps are included.

Step 300: The electronic device 100 sends a face registration instruction to the smart door lock 200. For example, as shown in FIG. 4(*a*), after the electronic device 100 is successfully connected to the smart door lock 200, after detecting that the user taps a facial recognition icon 121 on a desktop of the electronic device 100, the electronic device 100 sends a face registration instruction to the smart door lock 200.

Step 301: The smart door lock 200 shoots a face image in response to the face registration instruction. For example, the first camera 201 and the second camera 202 simultaneously enable a shooting function.

Step 302: The smart door lock 200 sends the shot face image to the electronic device 100. For example, the smart door lock 200 sends an image shot by the first camera 201 to the electronic device 100.

Step 303: The electronic device 100 generates prompt information based on the received face image, to prompt the user to adjust the face to an optimal position.

In some embodiments, the electronic device 100 generates prompt information such as voice, text, and a picture based on the received face image, and displays the prompt information on a user interface of the electronic device 100, to prompt the user to adjust the position of the face. The picture is not a real picture of the face, and the picture is only a picture that can indicate a current position of the face, for example, a dynamic stick figure, cartoon image, or schematic diagram of the face.

For example, a text prompt "Stand half a meter away from a lock, and perform face registration toward a lock camera based on a voice prompt" is displayed on the interface of the electronic device 100 shown in FIG. 4(*b*). After the user taps a "Next" control 122 shown in FIG. 4(*b*), a user interface shown in FIG. 4(*c*) or FIG. 4(*d*) appears. Interfaces displayed in FIG. 4(*c*) and FIG. 4(*d*) each include a preview box 123 with the foregoing picture and a corresponding text prompt. The text prompt may be, for example, a text prompt 124*a* "Move your face to the left" shown in FIG. 4(*c*), and a text prompt 124*b* of "Move your face to the right" shown in FIG. 4(*d*). After moving the face based on the prompt information in FIG. 4(*c*) and FIG. 4(*d*), the user adjusts the face to an optimal position. For example, the user adjusts the face to a center of a field of view of the second camera 202 of the smart door lock 200.

Step 304: The smart door lock 200 acquires a face image at the optimal position, and generates a notification message indicating that the face is successfully registered. The optimal position may be a central position of the field of view the second camera 202. The face image acquired by the smart door lock 200 at the optimal position may be a face image acquired by the first camera 201 of the smart door lock 200 when the face of the user is at the central position of the field of view of the second camera 202.

In some embodiments, after the face of the user is adjusted to the optimal position, to make registered face information more complete and improve security of facial recognition, the user interface of the electronic device 100 may further generate prompt information for collecting images of the face of the user at different perspectives, for example, a text prompt 124*c* "Raise your head" shown in FIG. 4(*e*), a text prompt 124*d* "Lower your head" shown in FIG. 4(*f*), a text prompt 124*e* "Turn your face to the right" shown in FIG. 4(*g*), and a text prompt 124*f* "Turn your face to the left" shown in FIG. 4(*h*).

In addition, the preview box 123 may further prompt the user with a face registration progress. For example, after the user completes an action of raising the head based on the text prompt 124*c*, an upper are graphic in four are graphics on a periphery of the preview box 123 may change a color or blink, to prompt the user that a face has been registered when the user raises the head. After the user completes an action of lowering the head based on the text prompt 124*d*, a lower are graphic in the four are graphics on the periphery of the preview box 123 may change a color or blink, to prompt the user that a face has been registered when the user lowers the head, and the like. In addition, in some embodiments, after the user adjusts the face to the foregoing optimal position, and completes actions such as raising the head, lowering the head, turning the face to the left, and turning the face to the right based on the prompt information generated by the electronic device 100, the second camera 202 of the smart door lock 200 acquires a corresponding face image when the user is at the foregoing optimal position and the user raises the head, lowers the head, turns the face to the left, and turns the face to the right. When the smart door lock 200 performs feature extraction on face images acquired by the second camera 202, evaluates image quality, and determines that feature information of each angle of the face in the face images acquired by the second camera 202 can meet a preset requirement, the smart door lock 200 generates a notification message indicating that the face is successfully registered.

Step 305: The smart door lock 200 sends, to the electronic device 100, the notification message indicating that the face is successfully registered.

Step 306: The electronic device 100 generates, based on the received notification message indicating that the face is successfully registered, prompt information indicating that the face is successfully registered. For example, on the interface of the electronic device 100 shown in FIG. 4(*i*), a text "Operation successful" and a symbol prompt 125 are displayed. After the user taps a "Done" control 124*g* shown in FIG. 4(*i*), face registration is completed.

However, in the technical solution shown in FIG. 3, the electronic device 100 externally connected to the smart door lock 200 generates prompt information such as voice, text, and a picture based on the face image shot by the first camera 201 of the smart door lock 200. However, because the first camera 201 and the second camera 202 of the smart door lock 200 have differences in installation positions and fields of view, the prompt information generated by the electronic device 100 externally connected to the smart door lock 200 is inaccurate, affecting efficiency of face registration. In addition, a picture displayed by the electronic device 100 externally connected to the smart door lock 200 is not a real picture of the face. The picture is only a picture that can indicate a current position of the face, for example, a dynamic stick figure, cartoon image, or schematic diagram of the face, which cannot provide the user with user experience of seeing a real face in a face registration process.

Figure 5:
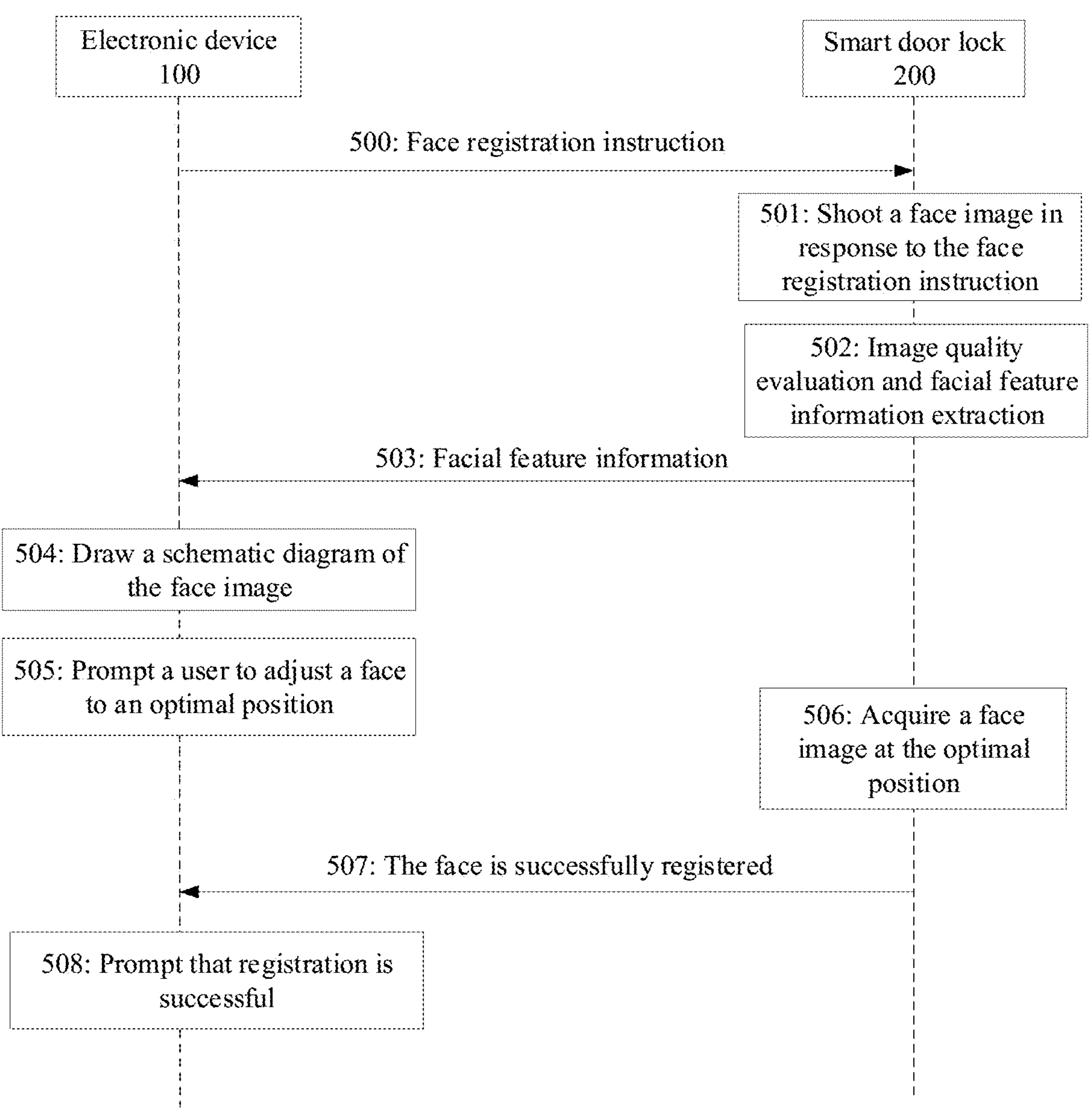
FIG. 5 is a flowchart of prompting, by an electronic device, a user to adjust a position of a face by generating a schematic diagram of a simulated face image according to some embodiments.

In addition, in some smart door lock technologies, to remind the user in real time to adjust the face to a shooting range of the second camera 202, the smart door lock 200 implements, through step 500 to step 508 shown in FIG. 5, that the external electronic device 100 reminds the user to adjust the position of the face by using a schematic simulation diagram of the face. Specifically, as shown in FIG. 5, the following steps are included.

Step 500: The electronic device 100 sends a face registration instruction to the smart door lock 200, to control the smart door lock 200 to start a face registration process.

Step 501: The smart door lock 200 shoots a face image in response to the face registration instruction. For example, the first camera 201 and the second camera 202 simultaneously enable a shooting function.

Step 502: The smart door lock 200 performs quality evaluation and facial feature information extraction on the shot face image. For example, the smart door lock 200 extracts, by using a feature extraction algorithm, key feature point information of the face from the image shot by the first camera 201, for example, extracts feature information of eyes, a mouth, a nose, eyebrows, and the like of a person.

Step 503: The smart door lock 200 sends the extracted facial feature information to the electronic device 100.

Step 504: The electronic device 100 draws a schematic diagram of the face image. For example, the electronic device 100 performs three-dimensional image modeling based on the facial feature information in the image that is shot by the first camera 201 and that is received from the smart door lock 200, to simulate a schematic diagram of the face.

Step 505: The electronic device 100 prompts the user to adjust the face to an optimal position.

Step 506: The smart door lock 200 acquires a face image at the optimal position.

Step 507: The smart door lock 200 sends, to the electronic device 100, a message indicating that the face is successfully registered.

Step 508: The electronic device 100 prompts that registration is successful.

However, in the technical solution shown in FIG. 5, the electronic device 100 draws the schematic diagram of the face image based on the image shot by the first camera 201 of the smart door lock 200, and then prompts the user to adjust the position of the face. However, because the first camera 201 and the second camera 202 of the smart door lock 200 have differences in installation positions and fields of view, a face preview image displayed by the electronic device 100 externally connected to the smart door lock 200 still cannot accurately reflect the position of the face in the field of view of the second camera 202, affecting accuracy of facial recognition. In addition, in the technical solution shown in FIG. 5, the schematic simulation diagram of the face displayed by the electronic device 100 externally connected to the smart door lock 200 is not a real picture of the face, and user experience of seeing a real face in a face registration process still cannot be provided for the user.

To resolve the foregoing technical problem, and better improve user experience of seeing a real face in a face registration process by the user, this application provides a technical solution in which a preview image of a real face may be directly displayed on the electronic device 100 externally connected to the smart door lock 200, which is more intuitive than a stick figure of the face and a schematic simulation diagram of the face. In addition, a position, an angle, an expression, and the like of the face are reflected by the face preview image displayed by the electronic device 100, which can be consistent with a situation of a face in an image shot by the second camera 202 of the smart door lock 200 for facial recognition.

Specifically, for example, the electronic device 100 shown in FIG. 1 may convert, by using a preset image processing method provided in this embodiment of this application, the image that is shot by the first camera 201 and that is received from the smart door lock 200 into a coordinate system of the image shot by the second camera 202, so that the face preview image displayed by the electronic device 100 can accurately reflect a position, an angle, an expression, and the like of the face in the field of view of the second camera 202. In this way, the user can adjust the position, the angle, the expression, and the like of the face in a timely manner by using the face preview interface and the prompt information of the electronic device 100, so that the second camera 202 of the smart door lock 200 can quickly capture a valid face image, for example, a face image that is shot at a plurality of perspectives and that includes all facial features, thereby improving efficiency and accuracy of face registration, and improving user experience.

It may be understood that, in a process of registering a face image by the smart door lock 200 shown in FIG. 1, to enable the first camera 201 and the second camera 202 of the smart door lock 200 to effectively shoot a face image, the electronic device 100 held by the user cannot block the first camera 201, the second camera 202, and the face of the user.

In addition, it may be understood that the electronic device 100 applicable to this embodiment of this application may be one of various portable terminal devices that have a displaying function and an image processing function, for example, a mobile phone, a band, a watch, and a tablet computer.

For ease of describing the technical solutions of this application, the following describes the technical solutions of this application in detail by using an example in which the first camera 201 is a cat-eye camera and the second camera 202 is a TOF camera.

The following describes in detail a hardware structure and a system structure of the smart door lock 200 shown in FIG. 1 with reference to the accompanying drawings.

Figure 6:
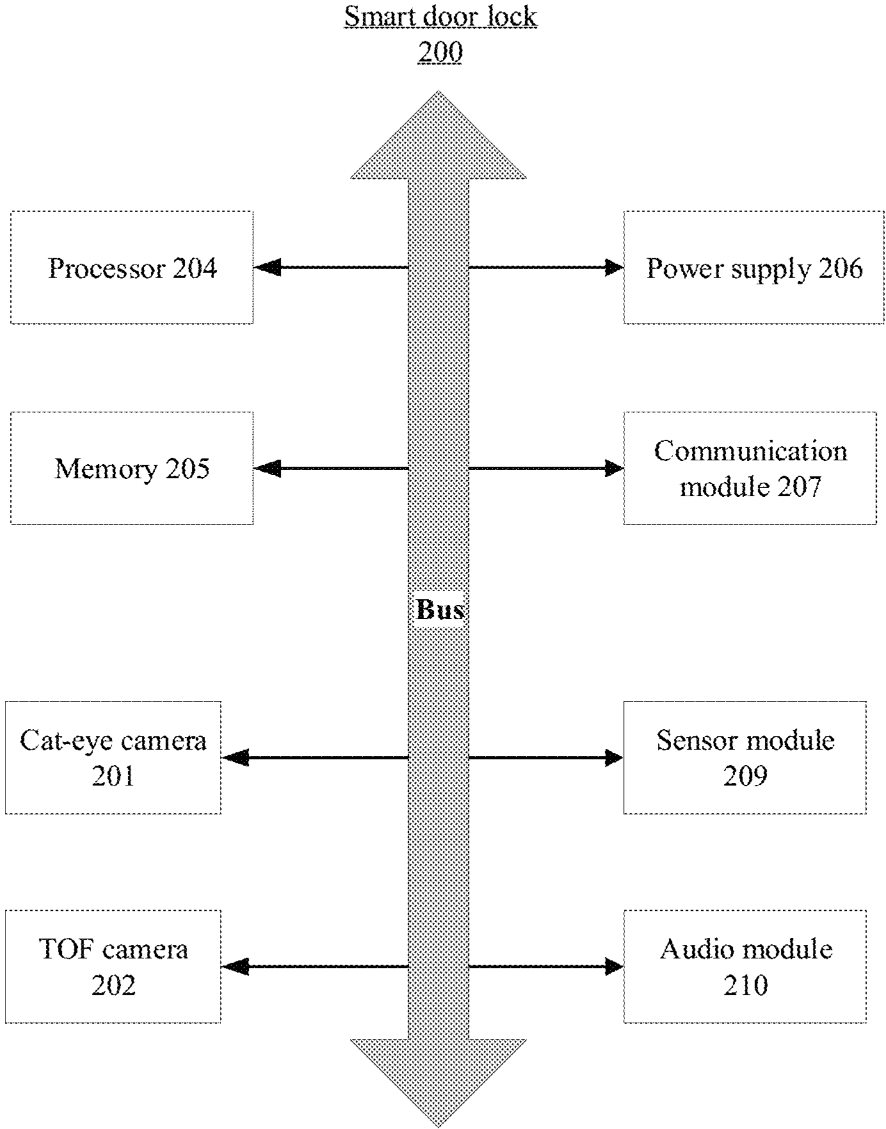
FIG. 6 is a block diagram of a structure of a smart door lock according to some embodiments of this application.

A hardware structure of the smart door lock 200 is first described. FIG. 6 is a block diagram of a hardware structure of a smart door lock 200 according to some embodiments of this application. The smart door lock 200 includes a processor 204, a memory 205, a cat-eye camera 201, a TOF camera 202, a power supply 206, a communication module 207, a sensor module 209, and an audio module 210.

The processor 204 may include one or more processing units, for example, may include a processing module or processing circuit such as a central processing unit CPU (Central Processing Unit), a graphics processing unit GPU (Graphics Processing Unit), a digital signal processor DSP (Digital Signal Processor), a microprocessor MCU (Micro-programmed Control Unit), an AI (Artificial Intelligence, artificial intelligence) processor, or a programmable logic device FPGA (Field Programmable Gate Array). Different processing units may be independent components, or may be integrated into one or more processors. In some embodiments, the processor 204 is configured to perform quality evaluation on a face image shot by the TOF camera 202, for example, perform evaluation on definition of the face image and whether all the facial features are in the face image. In some embodiments, the processor 204 is configured to perform facial feature information extraction on the face image shot by the TOF camera 202, and perform facial recognition based on the extracted facial feature information, to unlock a door for the user and allow the user to enter a room when the face of the user is recognized. In some embodiments, the processor 204 is further configured to: when it is determined that the face is successfully registered, generate a message indicating that the face is successfully registered, and send, by using the communication module 207, the message indicating that the face is successfully registered to the external electronic device 100.

The memory 205 is configured to store a software program and data, and may be a volatile memory (Volatile Memory), for example, a random access memory (Random-Access Memory, RAM), a double data rate synchronous dynamic random access memory (Double Data Rate Synchronous Dynamic Random Access Memory, DDR SDRAM), or may be a non-volatile memory (Non-Volatile Memory), for example, a read-only memory (Read-Only Memory, ROM), an electrically erasable programmable read-only memory (Electrically Erasable Programmable read only memory, EEPROM), a flash memory (Flash Memory), a hard disk drive (Hard Disk Drive, HDD), or a solid-state drive (Solid-State Drive, SSD). The processor 204 executes various functional applications and data processing of the smart door lock 200 by running the software program and the data stored in the memory 205. For example, in some embodiments of this application, the memory 205 may store photos shot by cameras of the smart door lock 200, the extracted facial feature information, an unlock history, and the like.

The cat-eye camera 201 is configured to shoot a face image for preview.

The TOF camera 202 is configured to shoot a face image for facial recognition.

The sensor module 209 is configured to obtain a state of the user or the smart door lock 200, and may include a pressure sensor, an infrared sensor, and the like.

The communication module 207 may be configured to perform communication between the smart door lock 200 and another electronic device. For example, in some embodiments of this application, the smart door lock 200 may establish a communication connection to the electronic device 100 in a communication manner such as Wi-Fi, Bluetooth, or NFC. The smart door lock 200 may receive, by using the communication module 207, an instruction sent by the electronic device 100. The smart door lock 200 may send, by using the communication module 207, a face image shot by the cat-eye camera 201 to the electronic device 100. When determining that the face is successfully registered, the smart door lock 200 sends, by using the communication module 207, the message indicating that the face is successfully registered to the electronic device 100.

The audio module 210 is configured to convert digital audio information into an analog audio signal output, or convert an analog audio input into a digital audio signal. The audio module 210 may be further configured to encode and decode an audio signal. In some embodiments, the audio module 210 may be configured to play a voice prompt to the user.

The power supply 206 is configured to supply power to components of the smart door lock 200. In some embodiments, the power supply 206 includes a battery.

It may be understood that a structure of the smart door lock 200 shown in FIG. 6 is merely an example. In some other embodiments, the smart door lock 200 may further include more or fewer modules, or may combine or split some modules. This is not limited in this embodiment of this application.

Figure 7:
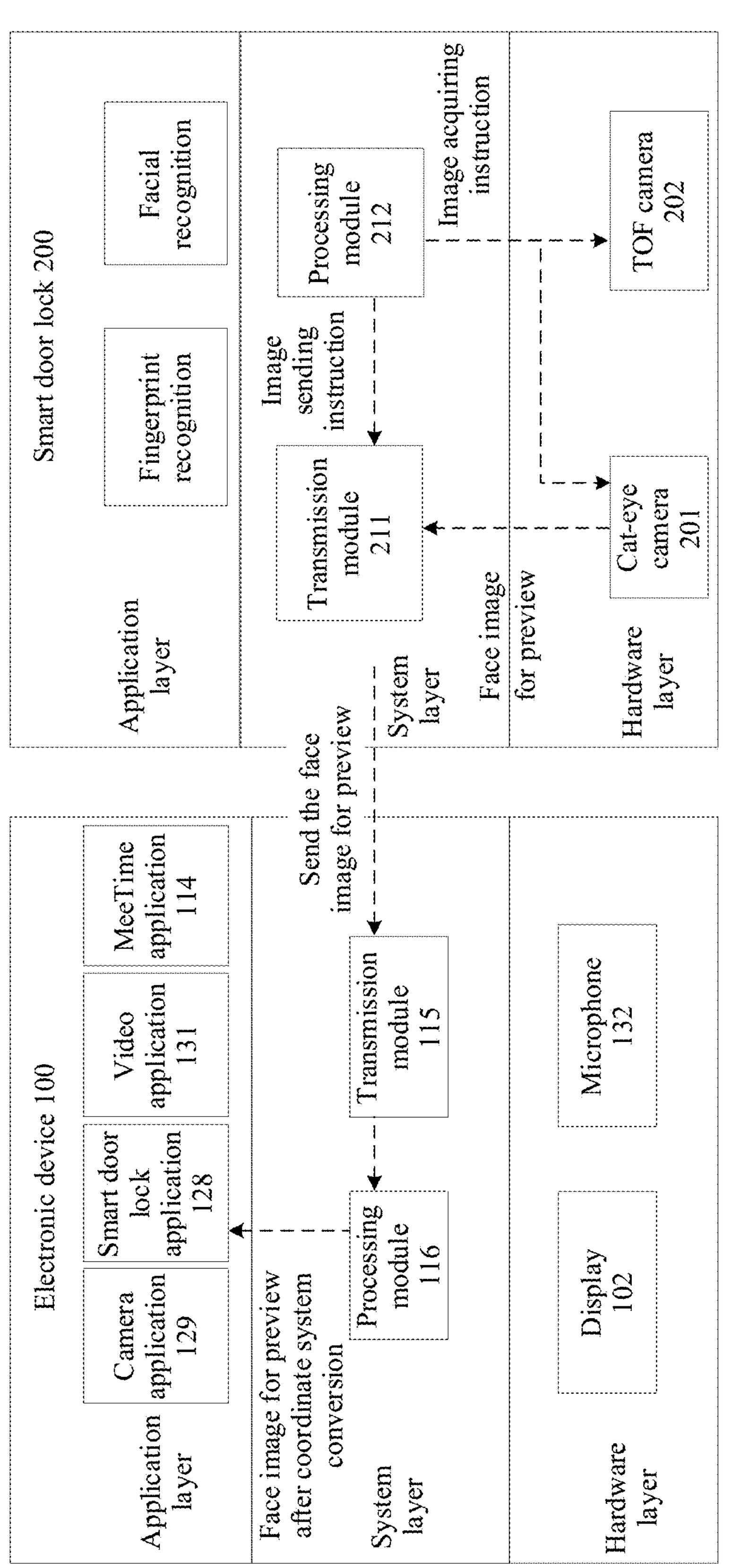
FIG. 7 is a block diagram of a structure of a system including an electronic device and a smart door lock according to some embodiments of this application.

The following describes a diagram of a layered system architecture of the smart door lock 200 and the electronic device 100 shown in FIG. 1. FIG. 7 is a diagram of a layered system architecture of a smart door lock 200 and an electronic device 100 that can implement technical solutions of this application. As shown in FIG. 7, the smart door lock 200 includes a processing module 212, a transmission module 211, a cat-eye camera 201, a TOF camera 202, and the like.

The processing module 212 is configured to generate a control instruction, control the cat-eye camera 201 and the TOF camera 202 to acquire a face image, and perform quality evaluation, facial feature information extraction, facial recognition, and the like on the face image acquired by the TOF camera 202, for example, perform evaluation on definition of the face image and whether all the facial features are in the face image. For an image that meets a quality requirement, for example, when the face of the user is at a center of a field of view of the TOF camera 202, after the facial feature information extraction is performed on the face image shot by the TOF camera 202, the processing module 212 may compare the extracted feature information with facial feature information pre-stored by the smart door lock 200, to control the smart door lock 200 to unlock a door and allow the user to enter a room when comparison succeeds.

The cat-eye camera 201 is configured to shoot a face image for preview. The face image is a two-dimensional image, and the face has relatively large distortion.

The TOF camera 202 is configured to shoot a face image for facial recognition. The image is a black-and-white three-dimensional image that includes depth information of the face.

The transmission module 211 is configured to send, to the electronic device 100 in response to an image sending instruction of the processing module 212, the face image shot by the cat-eye camera 201 for preview. The transmission module 211 may be further configured to: when the processing module 212 determines that the face is successfully registered, send, to the electronic device 100 in response to a message sending instruction of the processing module 212, a message indicating that the face is successfully registered. The transmission module 211 may be further configured to receive, from the electronic device 100, an instruction for enabling a face registration process, and the like.

Still refer to FIG. 7. The electronic device 100 includes a processing module 116, a transmission module 115, a display 102, a microphone 132, a smart door lock application 128, a camera application 129, a video application 131, a MeeTime application 114, and the like.

The processing module 116 is configured to process, by using a preset image processing method, a face image received from the smart door lock 200 for preview, and convert the face image used for preview into a coordinate system of the image shot by the TOF camera 202 of the smart door lock 200. In this way, a processed face image for preview can accurately reflect information such as a posture and a position of the face in the field of view of the TOF camera 202 of the smart door lock 200. The processing module 116 is further configured to: when an operation performed by the user on the smart door lock application 128 of the electronic device 100 is detected, generate an instruction for initiating a face registration process, and send the instruction to the smart door lock 200 by using the transmission module 115.

The transmission module 115 is configured to receive, from the smart door lock 200, the face image for preview and the message indicating that the face is successfully registered, and send a face registration instruction and the like to the smart door lock 200.

The display 102 is configured to display a face preview interface and prompt information of the smart door lock application 128, a user interface of another application program, and the like.

The microphone 132 is configured to play voice prompt information to assist the user in adjusting a position, an angle, an expression, and the like of the face.

It may be understood that the system structure shown in FIG. 7 is an example of a system structure, and does not constitute a specific limitation on the smart door lock 200 and the electronic device 100 that can implement the technical solutions of this application. In some other embodiments of this application, the smart door lock 200 and the electronic device 100 may include more or fewer components than those shown in FIG. 7, or some components may be combined, or some components may be split, or there may be a different component layout. The components shown in FIG. 7 may be implemented by hardware, software, or a combination of software and hardware.

Embodiment 1

Figure 8:
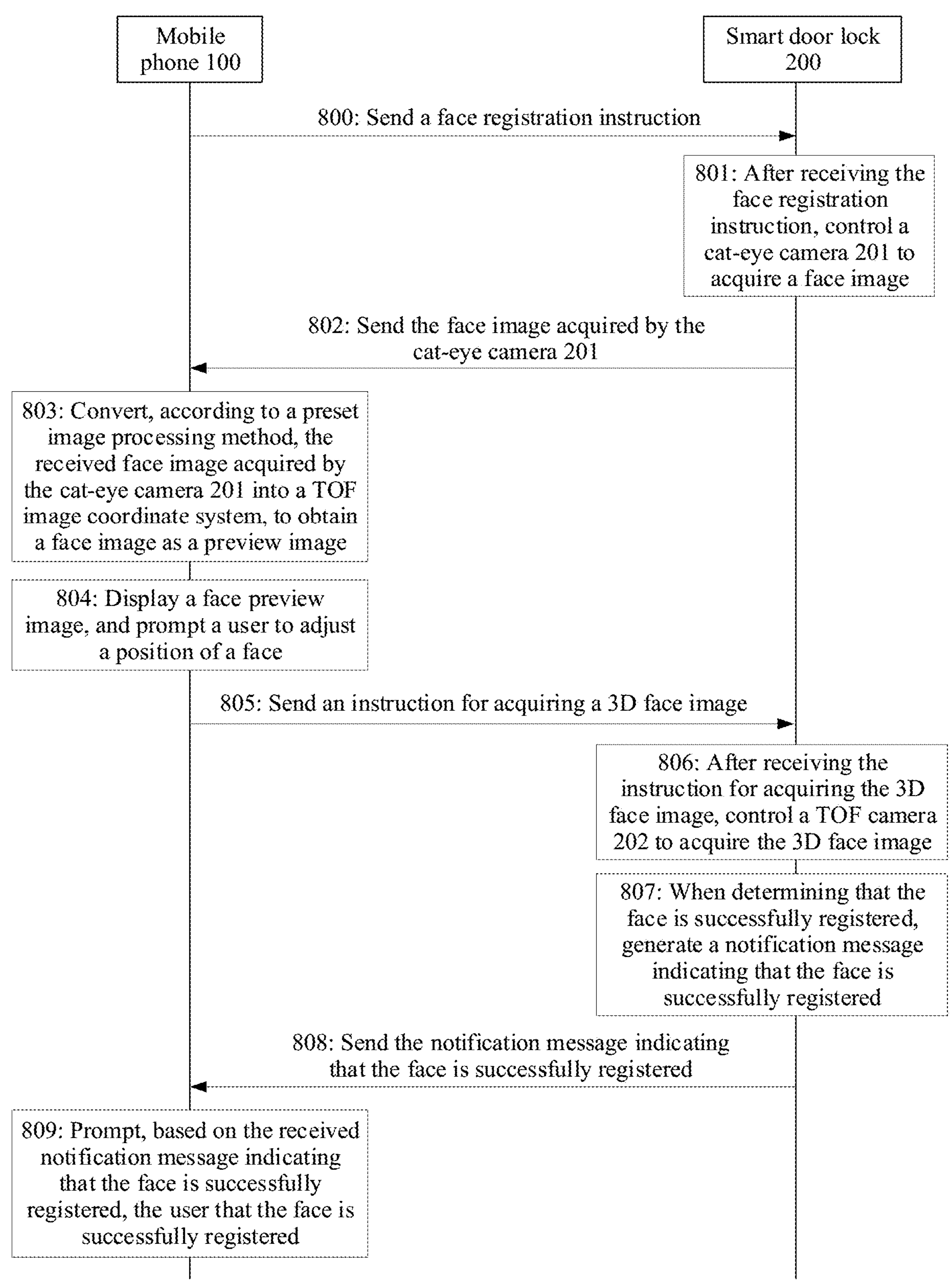
FIG. 8 is a flowchart of interaction between a mobile phone and a smart door lock according to some embodiments of this application.
Figure 9B:
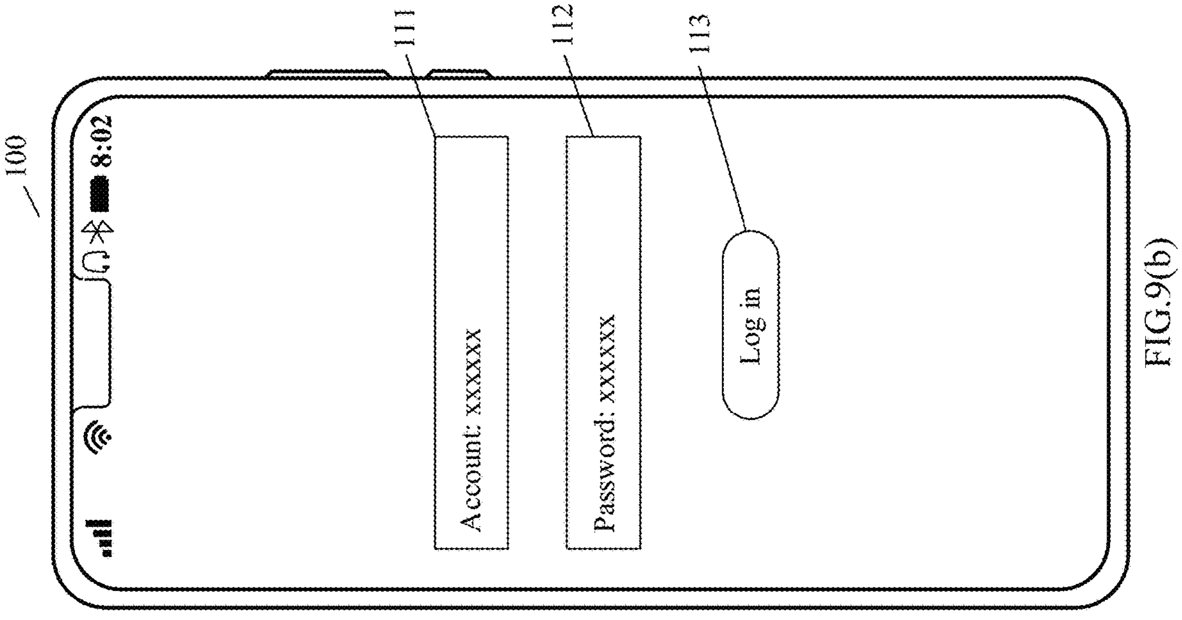
FIG. 9(*a*) to FIG. 9(*i*) are diagrams of some user interfaces of a mobile phone in the flowchart shown in FIG. 8 according to some embodiments of this application.
Figure 9A:
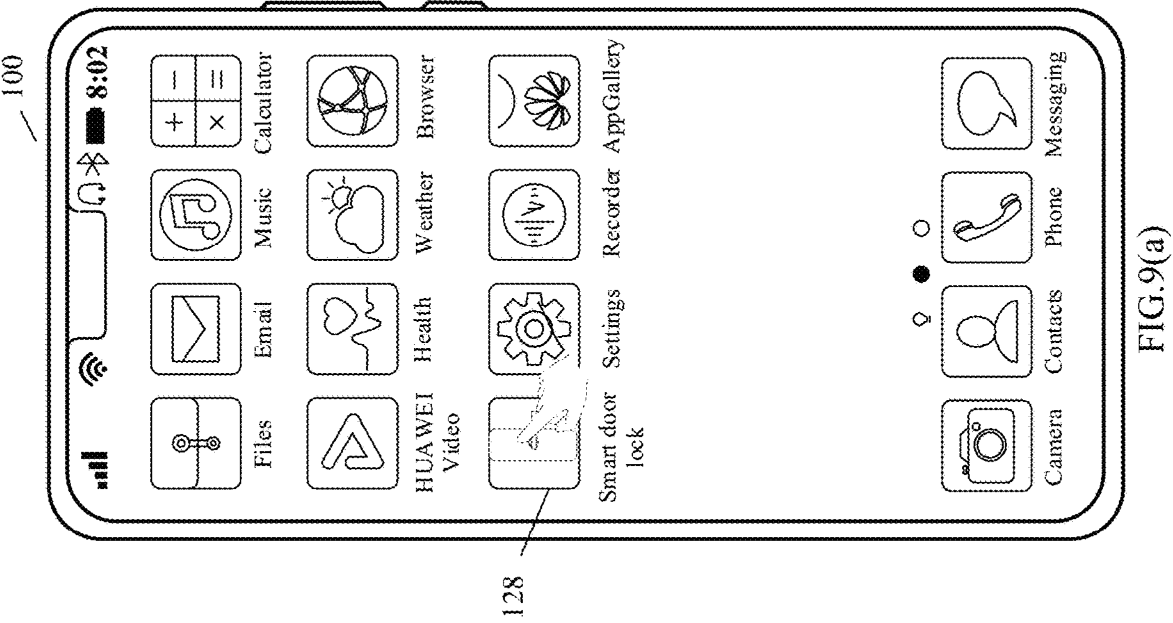
Figures 9C, 9D:
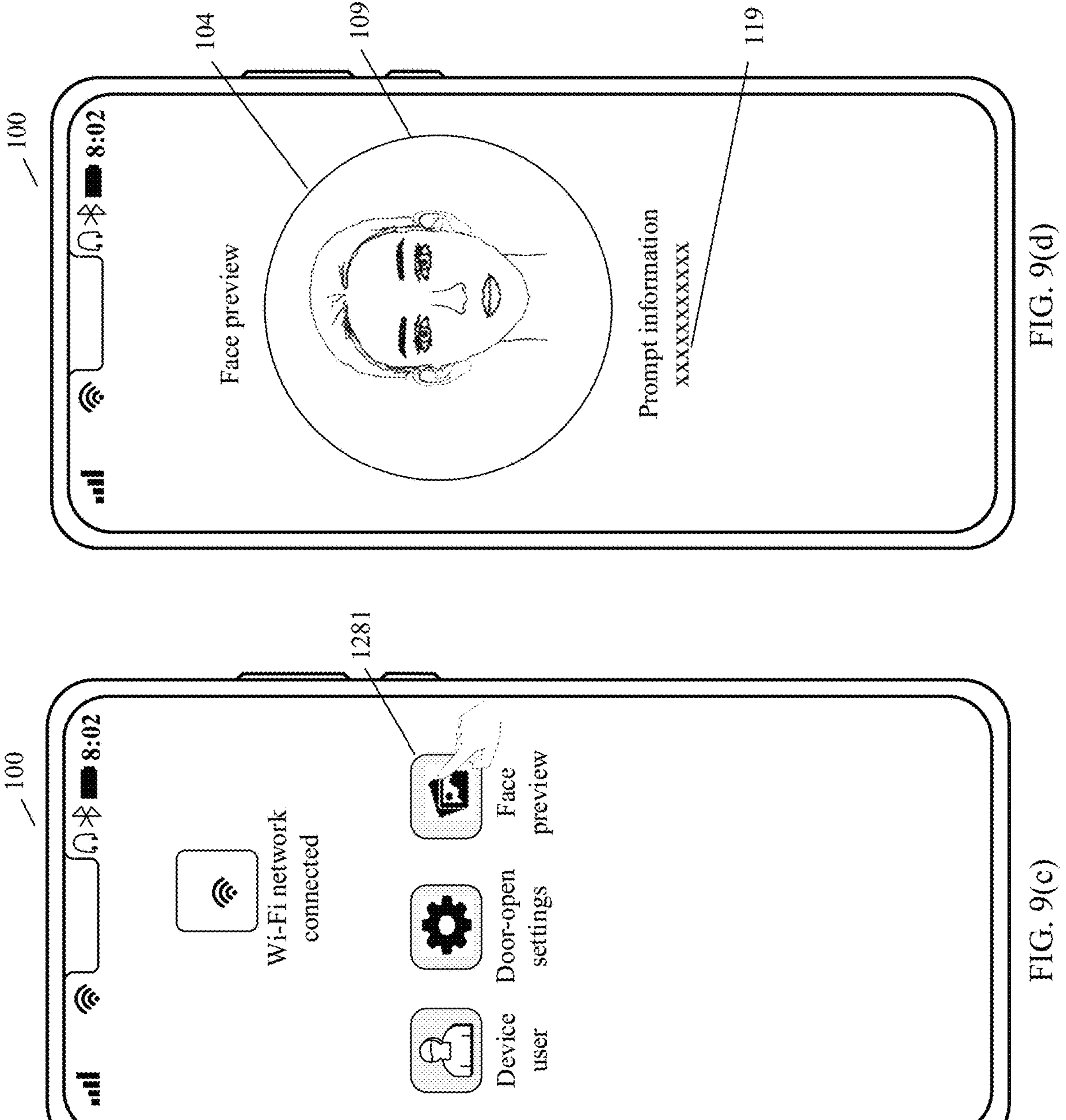
Figure 9F:
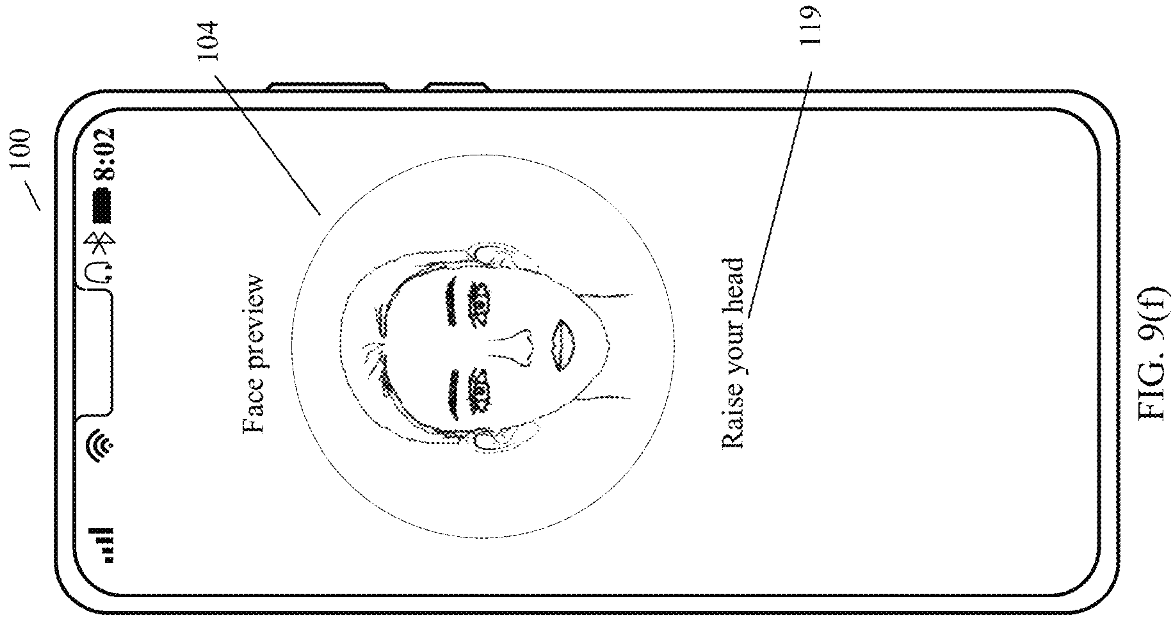
Figure 9E:
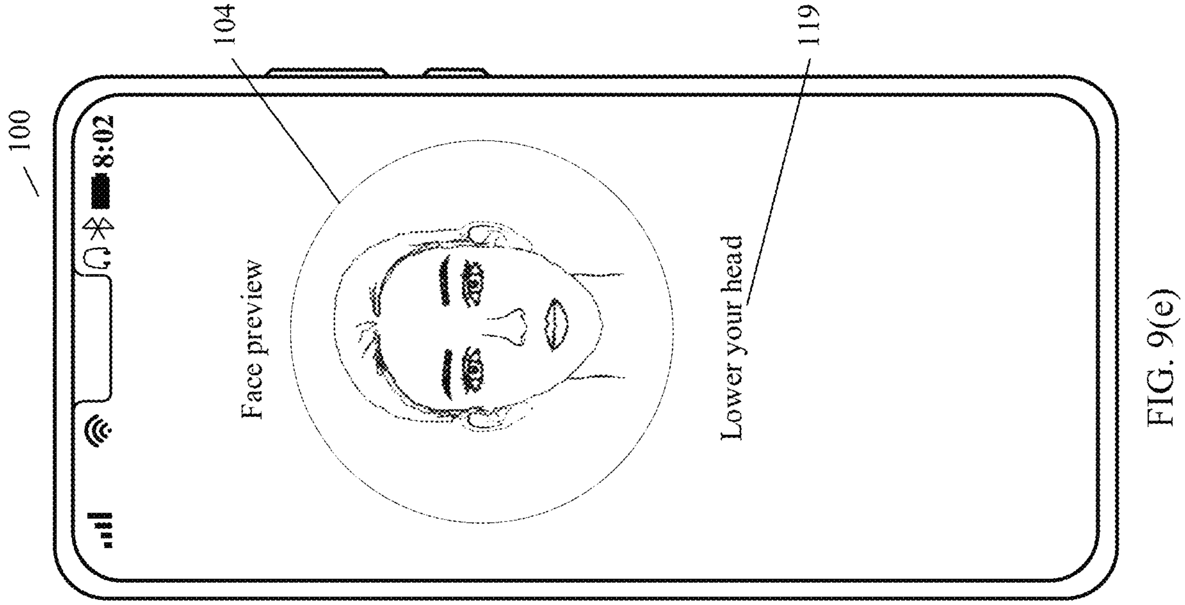
Figure 9H:
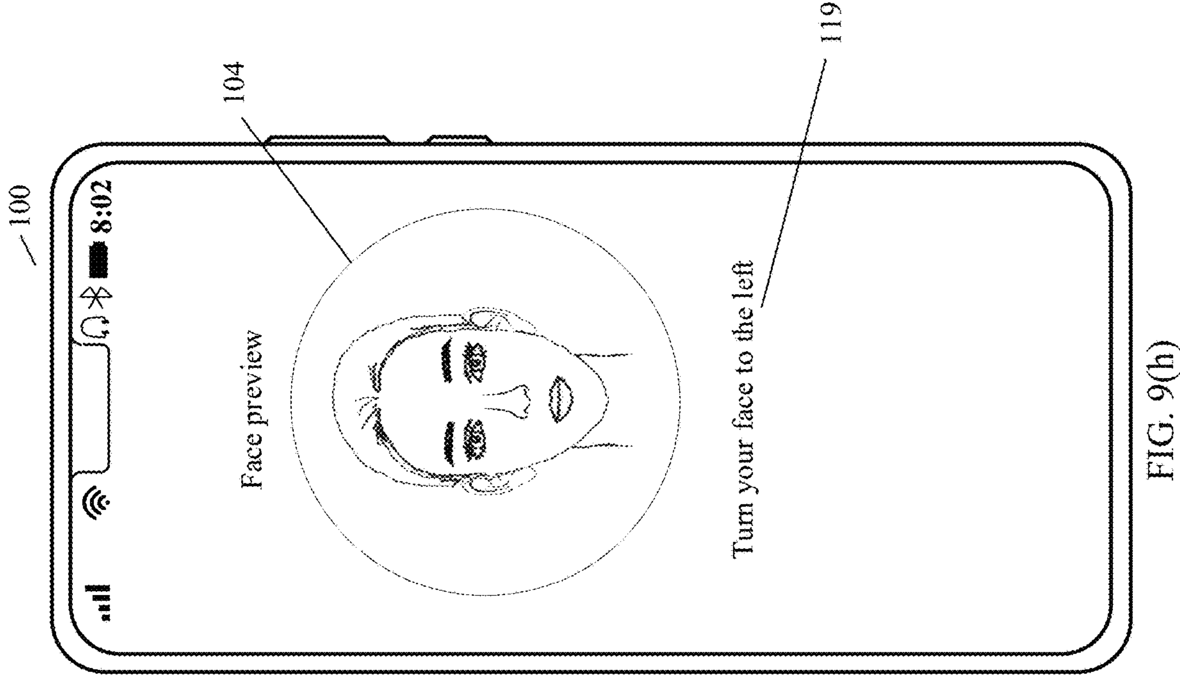
Figure 9G:
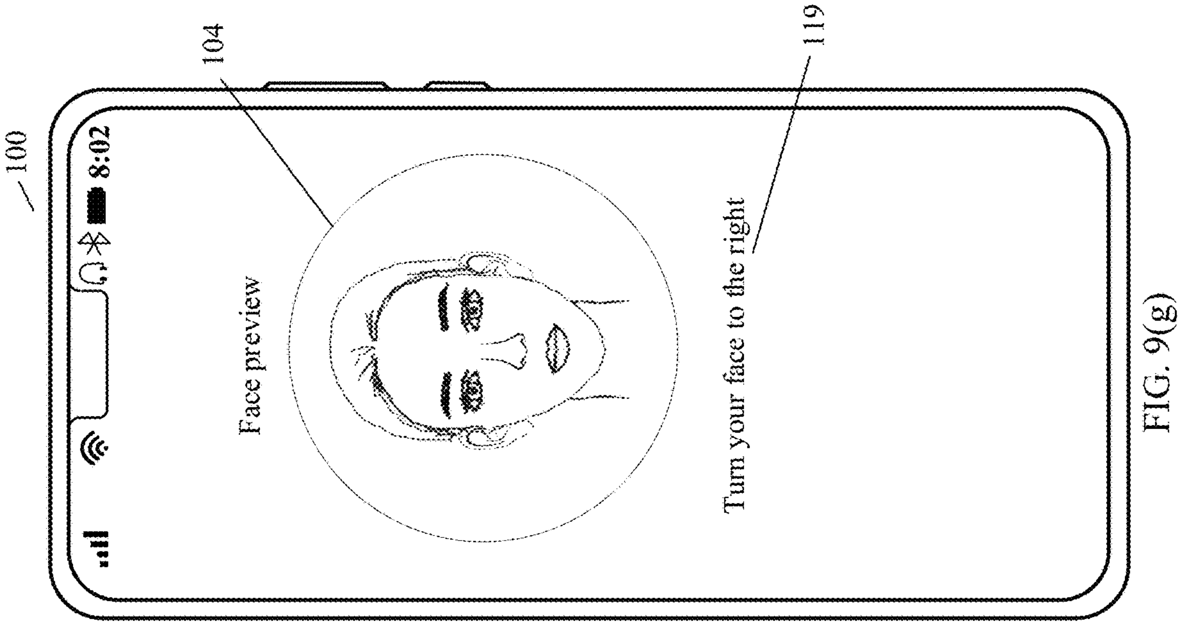
Figure 9I:
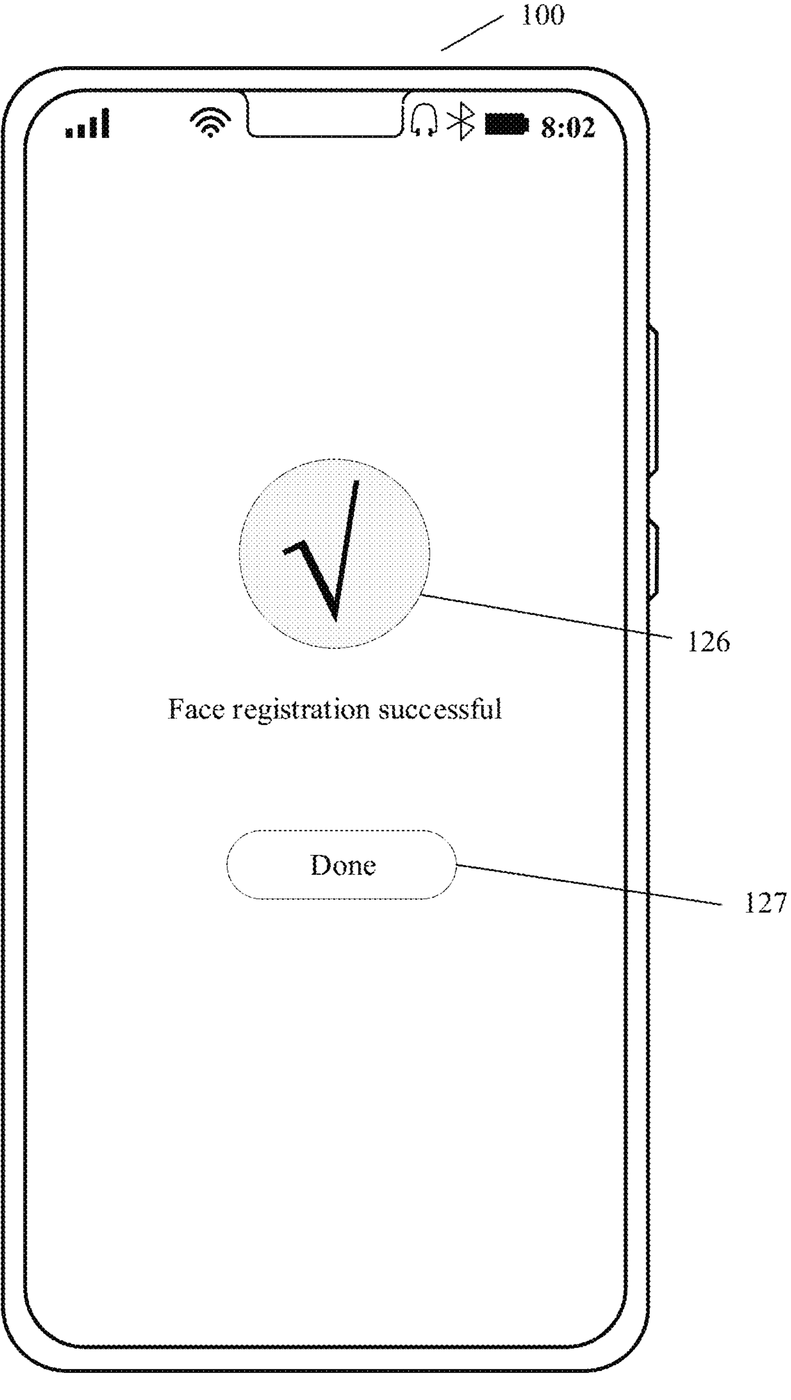

With reference to a diagram of a system structure shown in FIG. 7, the following describes in detail the technical solutions provided in this application by using an example in which an electronic device 100 is a mobile phone. Specifically, as shown in FIG. 8, a diagram of interaction between a smart door lock 200 and a mobile phone 100 includes the following steps.

Step 800: The mobile phone 100 sends a face registration instruction to the smart door lock 200.

For example, in some embodiments, a smart door lock application 128 of the mobile phone 100 generates an interrupt message in response to a user operation. It may be understood that the interrupt message herein is generated by the smart door lock application 128 of the mobile phone 100, to request a processing module 116 of the mobile phone 100 to generate a control instruction for enabling a face registration function of the smart door lock 200.

For example, in an embodiment shown in FIG. 9(*a*), the user taps an icon of the smart door lock application 128, and the mobile phone 100 opens the smart door lock application 128 in response to a tapping operation of the user, and displays a login interface of the smart door lock application 128 shown in FIG. 9(*b*). The login interface of the smart door lock application 128 shown in FIG. 9(*b*) includes an "Account" input box in, a "Password" input box 112, and a "Login" button 113. After the user enters an account in the "Account" input box in, enters a password in the "Password" input box 112, and taps the "Login" button 113, the mobile phone enters a user interface of the smart door lock application 128 shown in FIG. 9(*c*). On the user interface of the smart door lock application 128 shown in FIG. 9(*c*), the user taps a face preview icon 1281, to trigger the smart door lock application 128 to generate an interrupt message, so that the mobile phone 100 generates, based on the interrupt message, an instruction for starting face registration of the smart door lock 200.

Then, the smart door lock application 128 of the mobile phone 100 sends the generated interrupt message to the processing module 116 of the mobile phone 100. The processing module 116 of the mobile phone 100 generates a face registration instruction based on the received interrupt message. The instruction is used to enable the face registration function of the smart door lock 200.

In some embodiments, the processing module 116 of the mobile phone 100 sends the generated face registration instruction to the smart door lock 200 by using a transmission module 115. The transmission module 115 may be a Wi-Fi module, a Bluetooth module, or the like. For example, in some embodiments, the processing module 116 of the mobile phone 100 sends the generated face registration instruction to a transmission module 211 of the smart door lock 200 by using the transmission module 115 of the mobile phone 100.

Step 801: After receiving the face registration instruction, the smart door lock 200 controls a cat-eye camera 201 to acquire a face image.

For example, in some embodiments, the transmission module 211 of the smart door lock 200 sends the received face registration instruction to a processing module 212 of the smart door lock 200. After receiving the face registration instruction, the processing module 212 of the smart door lock 200 generates, in response to the received face registration instruction, a control instruction for controlling the cat-eye camera 201 to acquire an image.

In some embodiments, the processing module 212 of the smart door lock 200 generates, in response to the received face registration instruction, a control instruction for controlling both the cat-eye camera 201 and a TOF camera 202 to acquire an image. In some embodiments, the processing module 212 of the smart door lock 200 may further generate, in response to the received face registration instruction, a control instruction for controlling the cat-eye camera 201 to first acquire an image for preview, and then after the user adjusts a face to an optimal position and an optimal posture, controlling the TOF camera 202 to acquire an image for facial recognition.

In some embodiments, the processing module 212 of the smart door lock 200 sends, to the cat-eye camera 201 of the smart door lock 200, the generated control instruction for acquiring an image by the cat-eye camera 201. The cat-eye camera 201 of the smart door lock 200 acquires a face image in response to the received control instruction. For example, the cat-eye camera 201 acquires a face image at a speed of 30 frames per second.

Step 802: The smart door lock 200 sends, to the mobile phone 100, the face image acquired by the cat-eye camera 201.

For example, the cat-eye camera 201 of the smart door lock 200 sends the acquired face image to the transmission module 115 of the mobile phone 100 by using the transmission module 211 of the smart door lock 200, and then the transmission module 115 of the mobile phone 100 sends the received face image to the processing module 116 of the mobile phone 100.

Step 803: The mobile phone 100 converts, according to a preset image processing method, the received face image acquired by the cat-eye camera 201 into a TOF image coordinate system, to obtain a face image as a preview image.

Figures 10A, 10B, 10C:
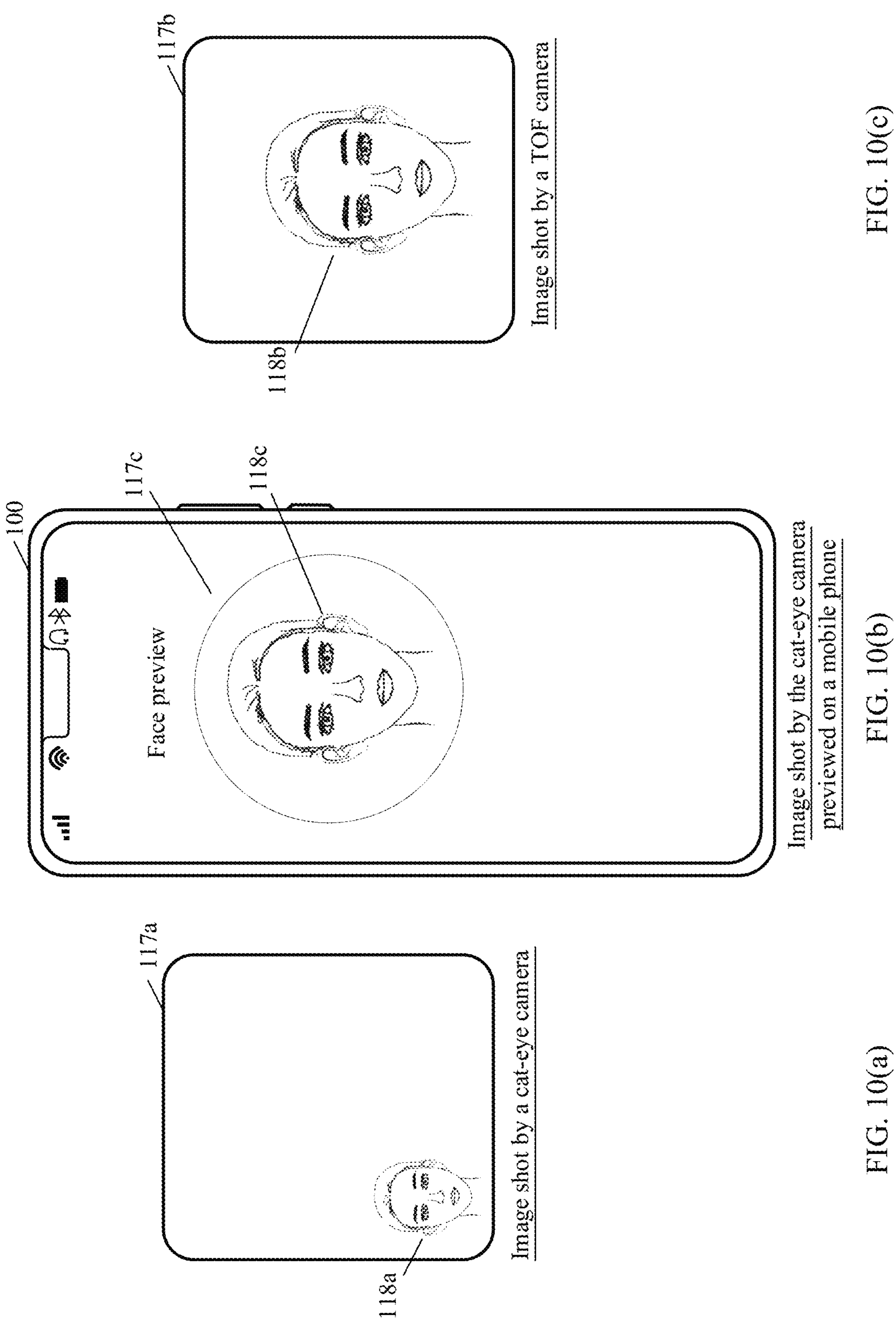
FIG. 10(*a*) to FIG. 10(*c*) show a case in which after a mobile phone and a smart door lock perform the technical solution shown in FIG. 8, a position of a face in a preview interface displayed by the mobile phone is consistent with a position of a face in a face image shot in the smart door lock for facial recognition, according to some embodiments of this application.

For example, in an embodiment shown in FIG. 10(*a*), in a face image 117*a* shot by the cat-eye camera 201, a face 118*a* is at an edge of a lower left corner of the face image 117*a*. The mobile phone converts, according to the preset image processing method, the face image 117*a* that is shot by the cat-eye camera 201 and that is received from the smart door lock 200 into the TOF image coordinate system, and displays the face image 117*a* on a face preview interface of the mobile phone 100 shown in FIG. 10(*b*). As shown in FIG. 10(*b*), a face image 118*c* in a face preview image 117*c* is at a central position of the face preview image 117*c*, and is at a same position as a face 118*b* in an image 117*b* shot by the TOF camera shown in FIG. 10(*c*), so that the face image acquired by the cat-eye camera 201 for preview can accurately reflect a position of the face in the image shot by the TOF for facial recognition. In this way, the user can adjust a position, an angle, an expression, and the like of a face in a timely manner by using the face preview interface of the mobile phone 100, so that the TOF camera 202 of the smart door lock 200 can quickly capture a valid face image (namely, a face image that is shot at a plurality of perspectives and that includes all facial features), thereby improving efficiency and accuracy of face registration, and improving user experience. The preset image processing method is described in detail below.

In some implementations, the foregoing TOF image coordinate system may be a plane rectangular coordinate system using a central position of a photosensitive chip of the TOF camera as an origin of coordinates.

Step 804: The mobile phone 100 displays a face preview image, and prompts the user to adjust the position of the face.

For example, after converting, according to the preset image processing method, the received face image acquired by the cat-eye camera 201 into the TOF image coordinate system to obtain the face image as the preview image, the processing module 116 of the mobile phone 100 generates an instruction for displaying the preview image, and sends the instruction to the smart door lock application 128 of the mobile phone 100.

The smart door lock application 128 of the mobile phone 100 displays the face preview image in response to the received instruction for displaying the preview image, and prompts the user to adjust the position of the face. For example, the mobile phone 100 displays a preview interface as shown in FIG. 9(*d*), including a face preview image 104, a face image 109 in the face preview image 104, and prompt information 119 below the face preview image 104. The face image 109 in the face preview image 104 is a face image that is shot by the cat-eye camera 201 and that is converted into the TOF image coordinate system.

The prompt information 119 may be a text prompt for prompting the user to adjust the face to an optimal position. For example, the prompt information 119 may be a text prompt "Move your face to the left" or "Move your face to the right" shown in FIG. 4(*c*). After moving the face based on the prompt information in FIG. 4(*c*) and FIG. 4(*d*), the user adjusts the face to an optimal position. For example, the user adjusts the face to a central position of the face preview image displayed on the mobile phone 100, or the user adjusts the face to be close to the central position of the preview image. It may be understood that, because the face preview image displayed by the mobile phone 100 is a face image that is shot by the cat-eye camera 201 and that is converted into the TOF image coordinate system, when a face in the face preview image displayed by the mobile phone 100 is at the central position of the preview image, the face is also at a center of a field of view of the TOF camera 202 of the smart door lock 200. In some embodiments, when the mobile phone 100 determines that the position of the face is close to the central position of the displayed face preview image, the mobile phone 100 skips displaying the foregoing prompt information for prompting the user to move the position of the face.

Step 805: The mobile phone 100 sends an instruction for acquiring a 3D face image to the smart door lock 200.

For example, in some embodiments, after the processing module 116 of the mobile phone 100 determines that the face of the user is adjusted to the optimal position, an instruction for acquiring a 3D face image is generated.

For example, in some embodiments, the processing module 116 of the mobile phone 100 performs feature extraction on the image shot by the cat-eye camera 201 in the TOF image coordinate system obtained through conversion, determines that the face is at a central position of the image shot by the cat-eye camera 201 in the TOF image coordinate system, and determines that the face of the user is adjusted to an optimal position. After it is determined that the face is adjusted to an optimal position, it indicates that the face is at an optimal position in the field of view of the TOF camera 202. A 3D face image acquired by the TOF camera 202 at the optimal position may obtain valid facial feature information, thereby effectively performing facial recognition.

In some embodiments, the processing module 116 of the mobile phone 100 sends the generated instruction for acquiring the 3D face image to the smart door lock 200. For example, in some embodiments, the mobile phone 100 sends, by using the transmission module 115 of the mobile phone, the instruction for acquiring the 3D face image generated by the processing module 116 to the transmission module 211 of the smart door lock 200. Then, the transmission module 211 of the smart door lock 200 sends the received instruction for acquiring the 3D face image to the processing module 212 of the smart door lock 200. The processing module 212 of the smart door lock 200 generates, in response to the received instruction for acquiring the 3D face image, a control instruction for controlling the TOF camera 202 to acquire a 3D face image, and sends the control instruction to the TOF camera 202 of the smart door lock 200.

Step 806: After receiving the instruction for acquiring the 3D face image, the smart door lock 200 controls the TOF camera 202 to acquire the 3D face image.

For example, in some embodiments, the TOF camera 202 of the smart door lock 200 acquires a 3D face image in response to the received control instruction for acquiring the 3D face image.

In some embodiments, to make registered face information more complete and improve security of facial recognition, in a process of acquiring the 3D face image by the TOF camera 202, when the face preview image 104 is displayed in real time on the preview interface of the mobile phone 100, the mobile phone 100 may further generate prompt information for prompting the user to adjust an orientation of the face, or adjust an expression or action of the face. For example, the mobile phone 100 generates prompt information for prompting the user to shoot a face image at a plurality of perspectives such as front, left, right, up, down, mouth open, mouth closed, and blinking. For example, the mobile phone 100 separately displays, below the face preview image 104, prompt information 119 "Lower your head", "Raise your head", "Turn your face to the right", and "Turn your face to the left" shown in FIG. 9(*e*) to FIG. 9(*h*).

Step 807: When determining that the face is successfully registered, the smart door lock 200 generates a notification message indicating that the face is successfully registered.

For example, in some embodiments, when the smart door lock 200 performs feature extraction on the 3D face image acquired by the TOF camera 202, evaluates image quality, and determines that feature information of each angle of the face in the 3D face image acquired by the TOF camera 202 can meet a preset standard, the smart door lock 200 determines that face registration succeeds, and generates a notification message indicating that the face is successfully registered. For example, the processing module 212 of the smart door lock 200 performs feature information extraction on the 3D face image acquired by the TOF camera 202. When the processing module 212 of the smart door lock 200 determines that all facial features such as eyes, a mouth, a nose, and eyebrows of the user at different perspectives such as front, left, right, head raising, and head lowering are extracted, and a proportion of these facial features meets a preset proportion threshold, it is determined that the face is successfully registered, and a notification message indicating that the face is successfully registered is generated.

Step 808: The smart door lock 200 sends, to the mobile phone 100, the notification message indicating that the face is successfully registered.

For example, in some embodiments, after generating the notification message indicating that the face is successfully registered, the processing module 212 of the smart door lock 200 sends the notification message to the mobile phone 100 by using the transmission module 211 of the smart door lock 200.

Step 809: The mobile phone 100 prompts, based on the received notification message indicating that the face is successfully registered, the user that the face is successfully registered.

For example, in some embodiments, after the mobile phone 100 receives, by using the transmission module 115, the notification message sent by the smart door lock 200 indicating that the face is successfully registered, the processing module 116 of the mobile phone 100 generates a control instruction based on the received message indicating that the face is successfully registered, and sends the generated control instruction to the smart door lock application 128 of the mobile phone 100. The smart door lock application 128 of the mobile phone 100 prompts, according to the received control instruction, that the face is successfully registered.

For example, prompt information 126 indicating that the face is successfully registered is displayed on an interface of the mobile phone 100 shown in FIG. 9(*i*), and the prompt information 126 includes a "Check mark" symbol and a text prompt "Face registration successful". After the user taps a "Done" button 127, it is determined that the smart door lock 200 completes face registration.

From the foregoing descriptions of FIG. 8, it can be learned that the mobile phone 100 converts, by using the preset image processing method, the face image that is shot by the cat-eye camera 201 and that is received from the smart door lock 200 into the TOF image coordinate system, so that the face preview image displayed by the mobile phone 100 can accurately reflect a position, an angle, an expression, and the like of the face in the field of view of the TOF camera 202. In this way, the user can adjust a position, an angle, an expression, and the like of the face in a timely manner by using the face preview interface and the prompt information of the mobile phone 100, so that the TOF camera 202 of the smart door lock 200 can quickly capture a valid face image (namely, a face image that is shot at a plurality of perspectives and that includes all facial features), thereby improving efficiency and accuracy of face registration, and improving user experience.

The following describes in detail a process in which the mobile phone 100 in step 803 converts, by using the preset image processing method, the image that is shot by the cat-eye camera 201 and that is received from the smart door lock 200 into the TOF image coordinate system.

Figure 11B:
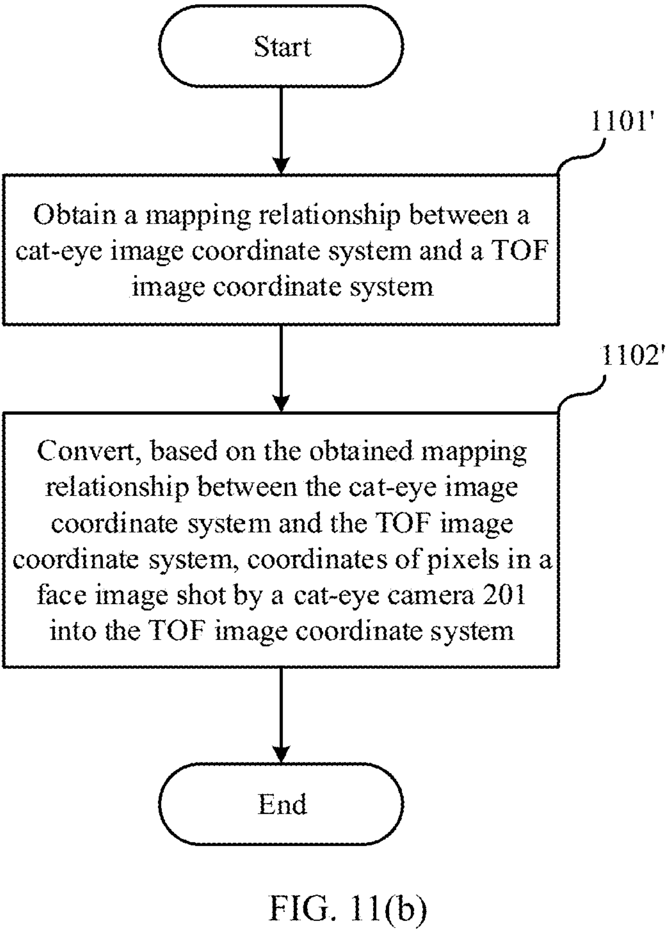
FIG. 11(*a*) shows a processing procedure in which a mobile phone maps a face image that is shot by a cat-eye camera and that is received from a smart door lock to a TOF camera coordinate system, according to some embodiments of this application.

FIG. 11(*a*) shows a processing procedure in which a mobile phone 100 converts an image that is shot by a cat-eye camera 201 for face preview and that is received from a smart door lock 200 into a TOF image coordinate system, according to some embodiments of this application. Refer to FIG. 11(*a*). The preset image processing method specifically includes the following steps.

Step 1101: The mobile phone 100 obtains a mapping relationship (denoted as a "first mapping relationship") between a cat-eye space coordinate system and a TOF space coordinate system, a mapping relationship (denoted as a "second mapping relationship") between the cat-eye space coordinate system and a cat-eye image coordinate system, and a mapping relationship (denoted as a "third mapping relationship") between the TOF space coordinate system and a TOF image coordinate system.

In some implementations, the cat-eye space coordinate system is a three-dimensional space coordinate system using a center of a lens of the cat-eye camera 201 as an origin of coordinates; the TOF space coordinate system is a three-dimensional space coordinate system using a center of a lens of the TOF camera 202 as an origin of coordinates; the cat-eye image coordinate system is a two-dimensional plane rectangular coordinate system using a center of a photosensitive chip of the cat-eye camera 201 as an origin of coordinates; and the TOF image coordinate system is a two-dimensional plane rectangular coordinate system using a center of a photosensitive chip of the TOF camera 202 as an origin of coordinates.

In addition, it is assumed that a point A is a point in three-dimensional space that appears in fields of view of both the cat-eye camera 201 and the TOF camera 202. Three-dimensional coordinates of the point A in the cat-eye space coordinate system are (x1, y1, z1), and two-dimensional coordinates of a pixel corresponding to the point A in an image shot by the cat-eye camera 201 are (x2, y2). Three-dimensional coordinates of the point A in the TOF space coordinate system are (x1', y1', z1), and two-dimensional coordinates of a pixel corresponding to the point A in an image shot by the TOF camera 202 are (x2', y2').

In this case, the first mapping relationship represents a mapping relationship between the three-dimensional coordinates (x1, y1, z1) of the point A in the cat-eye space coordinate system and the three-dimensional coordinates (x1', y1', z1') of the point A in the TOF space coordinate system.

The second mapping relationship represents a mapping relationship between the three-dimensional coordinates (x1, y1, z1) of the point A in the cat-eye space coordinate system and the two-dimensional coordinates (x2, y2) of the pixel corresponding to the point A in the image shot by the cat-eye camera 201.

The third mapping relationship represents a mapping relationship between the three-dimensional coordinates (x1', y1', z1') of the point A in the TOF space coordinate system and the two-dimensional coordinates (x2', y2') of the pixel corresponding to the point A in the image shot by the TOF camera 202.

In addition, it should be noted that the first mapping relationship to the third mapping relationship may be calibrated by research and development personnel by using a camera calibration algorithm before delivery of the smart door lock 200, and then stored in a memory of the smart door lock 200. When establishing a connection to the mobile phone 100 and using the mobile phone 100 as an external device to display the preview image of the face, the smart door lock 200 may send the stored first mapping relationship to third mapping relationship to the mobile phone 100. Alternatively, the mobile phone 100 obtains the first mapping relationship to the third mapping relationship by downloading and installing the smart door lock application 128.

For example, in some embodiments, before delivery of the smart door lock 200, the research and development personnel calibrate the first mapping relationship between the cat-eye camera 201 and the TOF camera 202, the second mapping relationship of the cat-eye camera 201, and the third mapping relationship of the TOF camera 202 according to the Zhang's calibration algorithm by using a calibration board, for example, a single planar checkerboard. In this way, the first mapping relationship between the cat-eye space coordinate system and the TOF space coordinate system shown in the following formula (1), the second mapping relationship between the cat-eye space coordinate system and the cat-eye image coordinate system shown in the following formula (2), and the third mapping relationship between the TOF space coordinate system and the TOF image coordinate system shown in the following formula (3) are obtained:

$$\begin{bmatrix} X_M \\ \hline 1 \end{bmatrix} = \begin{bmatrix} R & T \\ O^T & 1 \end{bmatrix} \begin{bmatrix} X_T \\ \hline 1 \end{bmatrix} \quad \text{Formula (1)}$$

-continued $$Z_m\begin{bmatrix}u_m\\v_m\\1\end{bmatrix}=\begin{bmatrix}f_{mx}&0&u_{m0}&0\\0&f_{my}&v_{m0}&0\\0&0&1&0\end{bmatrix}\begin{bmatrix}R_m&T_m\\\vec{0}&1\end{bmatrix}\begin{bmatrix}X_m\\Y_m\\Z_m\\1\end{bmatrix}\quad\text{Formula (2)}$$

$$Z_t\begin{bmatrix}u_t\\v_t\\1\end{bmatrix}=\begin{bmatrix}f_{tx}&0&u_{t0}&0\\0&f_{ty}&v_{t0}&0\\0&0&1&0\end{bmatrix}\begin{bmatrix}R_t&T_t\\\vec{0}&1\end{bmatrix}\begin{bmatrix}X_t\\Y_t\\Z_t\\1\end{bmatrix}\quad\text{Formula (3)}$$

Meanings of symbols in the foregoing formula (1) are as follows:

$X_M$ is three-dimensional coordinates, in coordinates of the calibration board, of a point in the cat-eye space coordinate system.

$X_T$ is three-dimensional coordinates, in coordinates of the calibration board, of a point (the same as the point in $X_M$) in the TOF space coordinate system.

R is a rotation matrix of the TOF space coordinate system relative to the cat-eye space coordinate system, and can be obtained by using a binocular calibration algorithm.

T is a translation matrix of the TOF space coordinate system relative to the cat-eye space coordinate system, and can be obtained by using the binocular calibration algorithm.

A matrix $$\begin{bmatrix}R&T\\0^T&1\end{bmatrix}$$

in formula (1) is an extrinsic matrix between the cat-eye camera 201 and the TOF camera.

Meanings of symbols in the foregoing formula (2) are as follows:

$u_m$ and $v_m$ are pixel coordinates of a point in the cat-eye image coordinate system.

$Z_m$ is a first calibration constant.

A matrix $$\begin{bmatrix}R_m&T_m\\\vec{0}&1\end{bmatrix}$$

is an extrinsic matrix from the cat-eye space coordinate system to a calibration board coordinate system.

$R_m$ and $T_m$ are camera extrinsic parameters of the cat-eye camera 201, and are respectively a rotation matrix and a translation matrix of the calibration board coordinate system relative to the cat-eye space coordinate system, which can be obtained by using the binocular calibration algorithm.

$X_m$, $Y_m$, and $Z_m$ are specific coordinate values of $X_M$ in formula (1). That is, coordinates of $X_M$ may be represented as ($X_m$, $Y_m$, $Z_m$), which represent three-dimensional coordinates, in the calibration board coordinate system, of a point in the cat-eye space coordinate system.

A matrix $$\begin{bmatrix}f_{mx}&0&u_{m0}&0\\0&f_{my}&v_{m0}&0\\0&0&1&0\end{bmatrix}$$

is a camera intrinsic matrix of the cat-eye camera 201, where parameters $f_{mx}$ and $f_{my}$ are focal length parameters of the cat-eye camera 201, and parameters $u_{m0}$ and $v_{m0}$ are origins of coordinates of two-dimensional pixel coordinates in an image shot by the cat-eye camera 201, which may be obtained by using the binocular calibration algorithm.

Meanings of symbols in the foregoing formula (3) are as follows:

$u_t$ and $v_t$ are pixel coordinates of a point in the TOF image coordinate system.

$Z_t$ is a second calibration constant.

A matrix $$\begin{bmatrix}f_{tx}&0&u_{t0}&0\\0&f_{ty}&v_{t0}&0\\0&0&1&0\end{bmatrix}$$

is a camera intrinsic matrix of the TOF camera 202, where $f_{tx}$ and $f_{ty}$ are focal length parameters of the TOF camera 202, and $u_{t0}$ and $v_{t0}$ are origins of coordinates of two-dimensional pixel coordinates in an image shot by the TOF camera 202, which may be obtained by using the binocular calibration algorithm.

$R_t$ and $T_t$ are camera extrinsic parameters of the TOF camera 202, and are respectively a rotation matrix and a translation matrix of the calibration board coordinate system relative to the TOF space coordinate system, which can be obtained by using the binocular calibration algorithm.

$X_t$, $Y_t$, and $Z_t$ are specific coordinate values of $X_T$ in formula (1). That is, coordinates of $X_T$ may be represented as ($X_t$, $Y_t$, $Z_t$), which represent three-dimensional coordinates of a point in the TOF space coordinate system in the calibration board coordinate system.

A matrix $$\begin{bmatrix}R_t&T_t\\\vec{0}&1\end{bmatrix}$$

is an extrinsic matrix from the TOF space coordinate system to the calibration board coordinate system.

Step 1102: The mobile phone 100 determines a mapping relationship (denoted as a "fourth mapping relationship") between the cat-eye image coordinate system and the TOF image coordinate system based on the obtained first mapping relationship between the cat-eye space coordinate system and the TOF space coordinate system, the obtained second mapping relationship between the cat-eye space coordinate system and the cat-eye image coordinate system, and the obtained third mapping relationship between the TOF space coordinate system and the TOF image coordinate system.

For example, in some embodiments, the mobile phone 100 may perform equation calculation on formula (1), formula (2), and formula (3) based on the first mapping relationship between the cat-eye space coordinate system and the TOF space coordinate system shown in formula (1), the second mapping relationship between the cat-eye space coordinate system and the cat-eye image coordinate system shown in the formula (2), and the third mapping relationship between the TOF space coordinate system and the TOF image coordinate system shown in the formula (3) that are obtain from the smart door lock 200, so that the fourth mapping relationship between the cat-eye image coordinate system and the TOF image coordinate system shown in formula (4) may be determined:

$$\begin{bmatrix} u_t \\ v_t \\ 1 \end{bmatrix} = \begin{bmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{bmatrix} \begin{bmatrix} u_m \\ v_m \\ 1 \end{bmatrix} + \begin{bmatrix} t_1 \\ t_2 \\ 1 \end{bmatrix} \quad \text{Formula (4)}$$

Meanings of symbols in the foregoing formula (4) are as follows:

$u_t$ and $v_t$ are pixel coordinates of a point in the TOF image coordinate system.

$u_m$ and $v_m$ are pixel coordinates of a point in the cat-eye image coordinate system.

$t_1$ and $t_2$ are translation conversion parameters of the cat-eye image coordinate system relative to the TOF image coordinate system.

A matrix $$\begin{bmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{bmatrix}$$

is a transformation matrix of pixel coordinates of a point in the cat-eye image coordinate system relative to pixel coordinates of a same point in the TOF image coordinate system.

Step 1103: The mobile phone 100 converts, based on the determined mapping relationship between the cat-eye image coordinate system and the TOF image coordinate system, coordinates of pixels in a face image shot by the cat-eye camera 201 into the TOF image coordinate system.

For example, the mobile phone 100 converts, by using a conversion relationship shown in the foregoing formula (4), coordinates of pixels in the face image that is shot by the cat-eye camera 201 for face preview and that is received from the smart door lock 200 into the TOF image coordinate system (the two-dimensional plane rectangular coordinate system using the center of the photosensitive chip of the TOF camera 202 as an origin of coordinates).

In this case, the mobile phone 100 can be enabled to convert the image that is shot by the cat-eye camera 201 for face preview and that is received from the smart door lock 200 into the TOF image coordinate system, so that the face preview image displayed by the mobile phone 100 can accurately reflect a position, an angle, an expression, and the like of the face in the field of view of the TOF camera 202. In this way, the user can adjust a position, an angle, an expression, and the like of the face in a timely manner by using the face preview interface and the prompt information of the mobile phone 100, so that the TOF camera 202 of the smart door lock 200 can quickly capture a valid face image, thereby improving efficiency and accuracy of face registration, and improving user experience.

It may be understood that the foregoing formula (4) is merely an example in which the mobile phone 100 converts pixels in the face image that is shot by the cat-eye camera 201 for face preview and that is received from the smart door lock 200 into the TOF image coordinate system. A specific conversion manner may be determined by the research and development personnel based on an actual situation. This is not limited in this application.

In some other embodiments, the mapping relationship (namely, the fourth mapping relationship) between the cat-eye image coordinate system and the TOF image coordinate system may be calculated in advance and then stored in the memory of the smart door lock 200. When establishing a connection to the mobile phone 100 and using the mobile phone 100 as an external device to display the preview image of the face, the smart door lock 200 may send the stored fourth mapping relationship to the mobile phone 100. Alternatively, the mobile phone 100 obtains the fourth mapping relationship by downloading and installing the smart door lock application 128.

With reference to FIG. 11(*b*), the following specifically describes in detail another implementation process in which the mobile phone 100 in step 803 converts, by using the preset image processing method, the image that is shot by the cat-eye camera 201 and that is received from the smart door lock 200 into the TOF image coordinate system.

FIG. 11(*b*) shows another processing procedure in which a mobile phone 100 converts an image that is shot by a cat-eye camera 201 for face preview and that is received from a smart door lock 200 into a TOF image coordinate system, according to some embodiments of this application. Refer to FIG. 11(*b*). The preset image processing method specifically includes the following steps.

Step 1101': The mobile phone 100 obtains a mapping relationship between a cat-eye image coordinate system and a TOF image coordinate system.

In some embodiments, before delivery of the smart door lock 200, the research and development personnel may calibrate a mapping relationship (denoted as a "first mapping relationship") between a cat-eye space coordinate system and a TOF space coordinate system, a mapping relationship (denoted as a "second mapping relationship") between the cat-eye space coordinate system and a cat-eye image coordinate system, and a mapping relationship (denoted as a "third mapping relationship") between the TOF space coordinate system and a TOF image coordinate system according to the Zhang's calibration algorithm by using a calibration board, for example, a single planar checkerboard. In this way, the first mapping relationship between the cat-eye space coordinate system and the TOF space coordinate system shown in the foregoing formula (1), the second mapping relationship between the cat-eye space coordinate system and the cat-eye image coordinate system shown in the foregoing formula (2), and the third mapping relationship between the TOF space coordinate system and the TOF image coordinate system shown in the foregoing formula (3) are obtained. Then, a mapping relationship (a fourth mapping relationship) between the cat-eye image coordinate system and the TOF image coordinate system shown in the foregoing formula (4) is calculated based on the calibrated first mapping relationship, the calibrated second mapping relationship, and the calibrated third mapping relationship, and then the calculated fourth mapping relationship is stored in a memory of the smart door lock 200. When establishing a connection to the mobile phone 100 and using the mobile phone 100 as an external device to display the preview image of the face, the smart door lock 200 may send the stored fourth mapping relationship to the mobile phone 100. Alternatively, the mobile phone 100 obtains the fourth mapping relationship by downloading and installing the smart door lock application 128.

For specific meanings of the first mapping relationship to the fourth mapping relationship and a specific calculation method, refer to corresponding descriptions in FIG. 11(*a*). Details are not described herein again.

Step 1102': The mobile phone 100 converts, based on the obtained mapping relationship (namely, the fourth mapping relationship) between the cat-eye image coordinate system and the TOF image coordinate system, coordinates of pixels in a face image shot by the cat-eye camera 201 into the TOF image coordinate system.

For example, the mobile phone 100 converts, by using a conversion relationship shown in the foregoing formula (4), coordinates of pixels in the face image that is shot by the cat-eye camera 201 for face preview and that is received from the smart door lock 200 into the TOF image coordinate system (the two-dimensional plane rectangular coordinate system using the center of the photosensitive chip of the TOF camera 202 as an origin of coordinates).

In this case, the mobile phone 100 can be enabled to convert the image that is shot by the cat-eye camera 201 for face preview and that is received from the smart door lock 200 into the TOF image coordinate system, so that the face preview image displayed by the mobile phone 100 can accurately reflect a position, an angle, an expression, and the like of the face in the field of view of the TOF camera 202. In this way, the user can adjust a position, an angle, an expression, and the like of the face in a timely manner by using the face preview interface and the prompt information of the mobile phone 100, so that the TOF camera 202 of the smart door lock 200 can quickly capture a valid face image, thereby improving efficiency and accuracy of face registration, and improving user experience.

Embodiment 2

In an embodiment shown in FIG. 8, a processing procedure of converting pixels in a face image shot by a cat-eye camera 201 for face preview into a TOF image coordinate system is implemented by a mobile phone 100. It may be understood that the processing procedure may be alternatively implemented by a smart door lock 200.

Still with reference to a diagram of a system structure shown in FIG. 7, the following describes another embodiment of the technical solutions provided in this application by using an example in which an electronic device 100 is a mobile phone.

Figure 12:
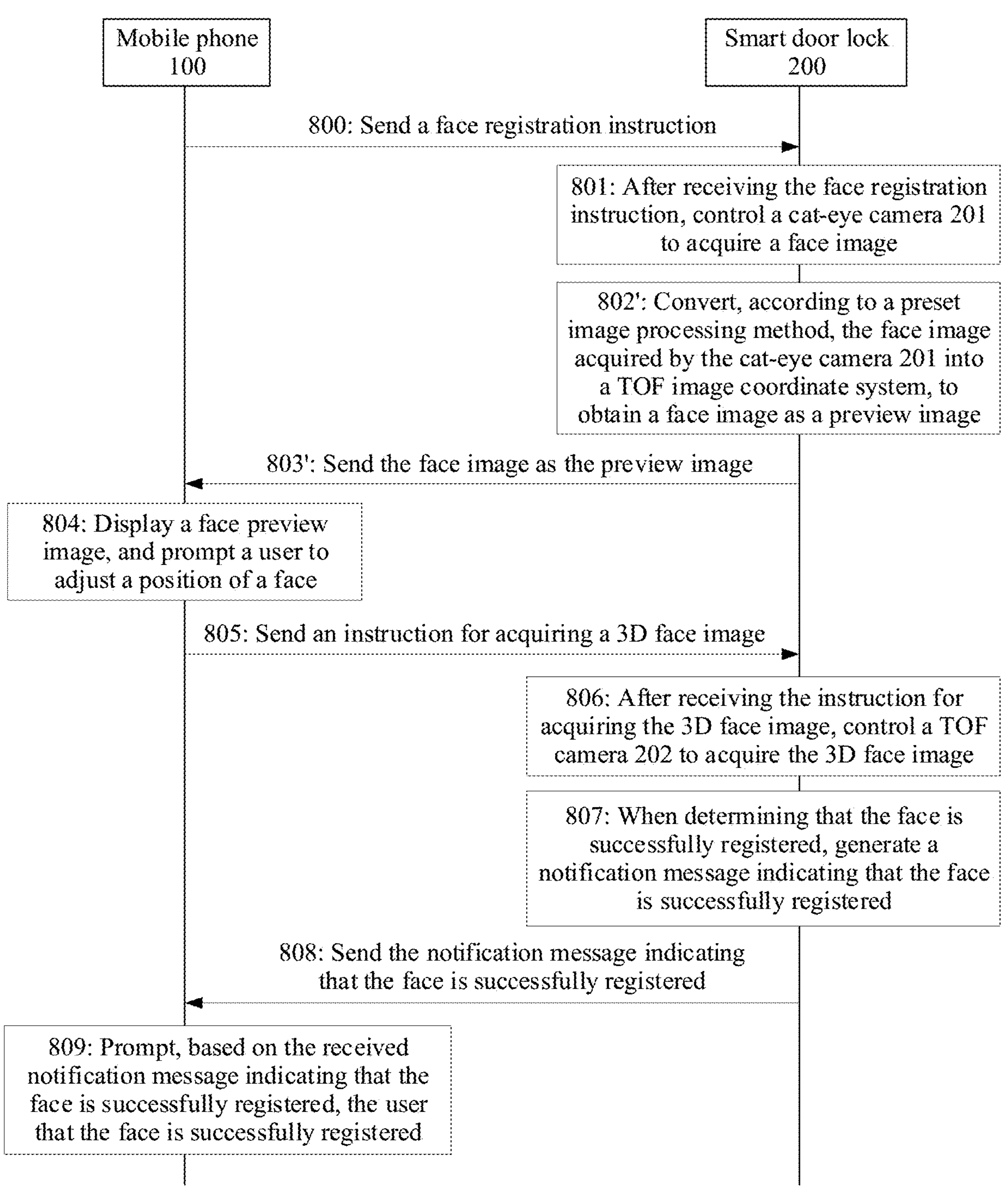
FIG. 12 is another flowchart of interaction between a mobile phone and a smart door lock according to some embodiments of this application.

Specifically, FIG. 12 shows an interaction diagram in a technical solution in which the smart door lock 200 implements conversion of pixels in the face image shot by the cat-eye camera 201 for face preview into the TOF image coordinate system. A difference between the interaction diagram shown in FIG. 12 and the interaction diagram shown in FIG. 8 in Embodiment 1 lies only in that: step 802' and step 803' in FIG. 12 are respectively different from step 802 and step 803 in FIG. 8, and other steps in FIG. 12 are the same as those in FIG. 8. Therefore, to avoid repetition, the following describes only step 802' and step 803' in FIG. 12. For other steps, refer to the foregoing descriptions of the interaction diagram shown in FIG. 8. Details are not described herein again. Specific content of step 802' and step 803' in FIG. 12 are respectively as follows.

Step 802': The smart door lock 200 converts, according to a preset image processing method, the face image acquired by the cat-eye camera 201 into the TOF image coordinate system, to obtain a face image as a preview image.

For example, in some embodiments, the cat-eye camera 201 of the smart door lock 200 sends the acquired face image to a processing module 212 of the smart door lock 200. The processing module 212 of the smart door lock 200 converts, according to the preset image processing method, the received face image acquired by the cat-eye camera 201 into the TOF image coordinate system.

For example, in some embodiments, after receiving the face image acquired by the cat-eye camera 201, the processing module 212 of the smart door lock 200 determines, according to the method shown in FIG. 11(*a*), a mapping relationship (namely, a fourth mapping relationship) between a cat-eye image coordinate system and the TOF image coordinate system based on a first mapping relationship, a second mapping relationship, and a third mapping relationship that are obtained from a memory of the smart door lock 200, and then converts, based on the determined fourth mapping relationship shown in the foregoing formula (4), pixels in the face image that is shot by the cat-eye camera 201 for face preview and that is received from the smart door lock 200 into the TOF image coordinate system.

In some embodiments, after receiving the face image acquired by the cat-eye camera 201, based on the mapping relationship (namely, the fourth mapping relationship) between the cat-eye image coordinate system and the TOF image coordinate system that is obtained from the memory of the smart door lock 200, the processing module 212 of the smart door lock 200 converts, according to the method shown in FIG. 11(*b*), pixels in the face image that is shot by the cat-eye camera 201 for face preview and that is received from the smart door lock 200 into the TOF image coordinate system. For details, reference may be made to related descriptions in Embodiment 1, and details are not described herein again.

Step 803': The smart door lock 200 sends the face image as the preview image to the mobile phone 100.

For example, in some embodiments, the processing module 212 of the smart door lock 200 sends, by using a transmission module 211 of the smart door lock 200, a face image that is converted into the TOF image coordinate system to a transmission module 115 of the mobile phone 100. Then, the transmission module 115 of the mobile phone 100 sends the received face image that is converted into the TOF image coordinate system to a processing module of the mobile phone 100. After receiving a converted face image, the processing module 116 of the mobile phone 100 generates a control instruction for displaying the preview image, to control a smart door lock application 128 of the mobile phone 100 to display the preview image. In this case, the face preview image displayed by the mobile phone 100 can accurately reflect a position, an angle, an expression, and the like of a face in a field of view of a TOF camera 202. In this way, a user can adjust the position, the angle, the expression, and the like of the face in a timely manner by using a face preview interface and prompt information of the mobile phone 100, so that the TOF camera 202 of the smart door lock 200 can quickly capture a valid face image, thereby improving efficiency and accuracy of face registration, and improving user experience.

Figure 13:
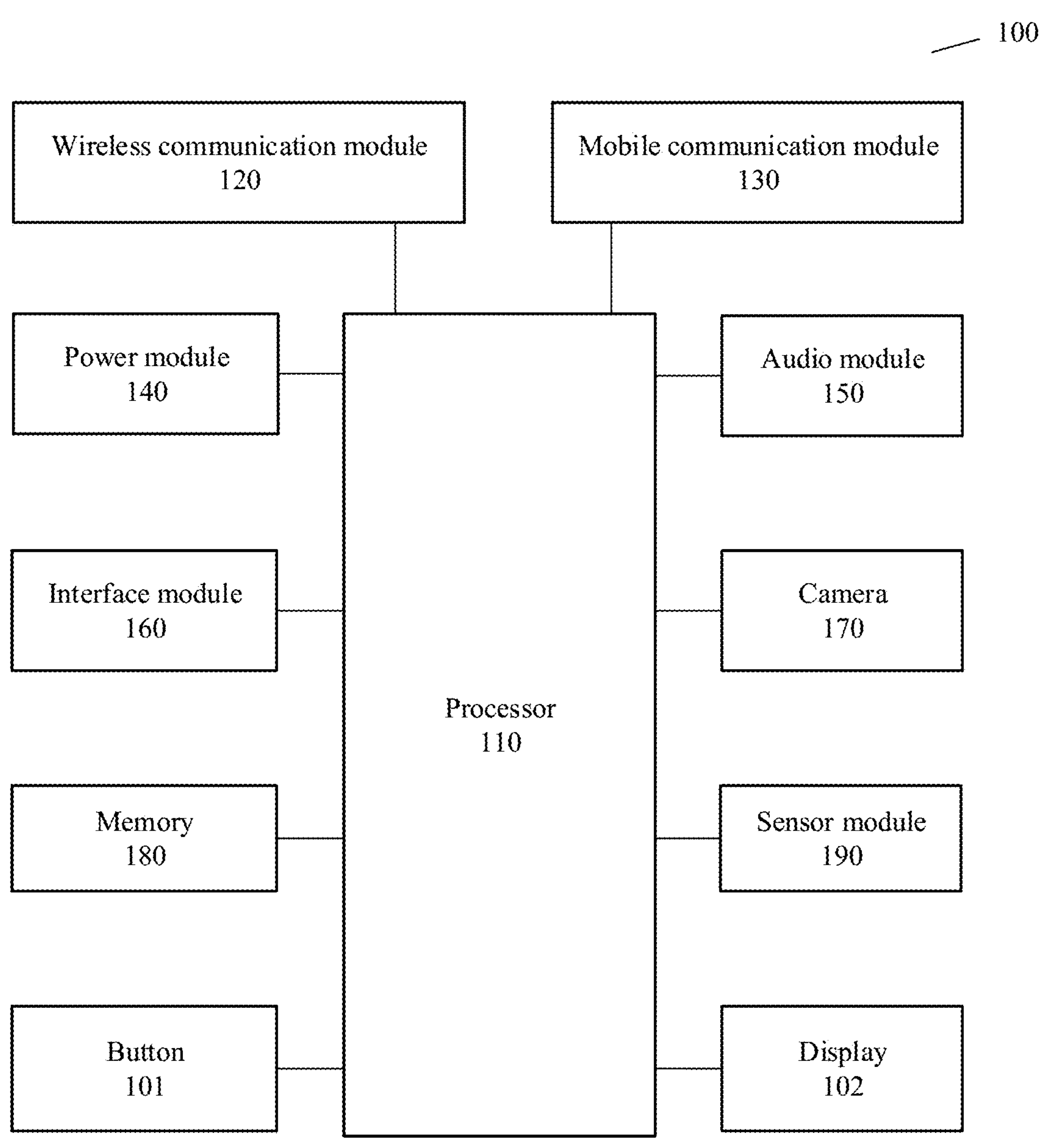
FIG. 13 is a block diagram of a structure of a mobile phone according to some embodiments of this application.

The following describes in detail the mobile phone 100 in the foregoing embodiments with reference to FIG. 13. Specifically, FIG. 13 is a schematic diagram of a hardware structure of a mobile phone 100 according to an embodiment of this application.

In FIG. 13, similar components have a same reference numeral. As shown in FIG. 13, the mobile phone 100 may include a processor 110, a power module 140, a memory 180, a camera 170, a mobile communication module 130, a wireless communication module 120, a sensor module 190, an audio module 150, an interface module 160, a button 101, a display 102, and the like.

It may be understood that a structure illustrated in this embodiment of the present invention does not constitute a specific limitation on the mobile phone 100. In some other embodiments of this application, the mobile phone 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units, for example, may include a processing module or a processing circuit such as a central processing unit (Central Processing Unit, CPU), a graphics processing unit (Graphics Processing Unit, GPU), a digital signal processor (Digital Signal Processor, DSP), a microprocessor (Micro-programmed Control Unit, MCU), an artificial intelligence (Artificial Intelligence, AI) processor, or a programmable logic device (Field Programmable Gate Array, FPGA). For example, in some embodiments of this application, the processor 110 may perform the method shown in FIG. 11(*a*) or FIG. 11(*b*), convert a face image that is shot by a cat-eye camera 201 and that is received from a smart door lock 200 into a TOF image coordinate system, and generate prompt information based on a converted image in TOF coordinates to prompt a user to adjust a face to a proper position.

The memory 180 may be configured to store data, a software program, and a module. In some embodiments of this application, the memory 180 may be configured to store a software program of the method shown in FIG. 11(*a*) or FIG. 11(*b*), so that the processor no runs the software program, converts a face image that is shot by a cat-eye camera 201 and that is received from a smart door lock 200 into a TOF image coordinate system, and generates prompt information based on a converted image in TOF coordinates to prompt a user to adjust a face to a proper position. In addition, the memory 180 may be further configured to store the face image that is shot by the cat-eye camera 201 and that is received from the smart door lock 200, a relationship between three-dimensional coordinate points of the cat-eye camera 201 and a TOF camera 202 that is received from the smart door lock 200, a relationship between three-dimensional coordinate points and two-dimensional coordinate points of the cat-eye camera 201 that is received from the smart door lock 200, a relationship between three-dimensional coordinate points and two-dimensional coordinate points of the TOF camera 202 that is received from the smart door lock 200, and the like.

The power module 140 may include a power supply, a power management component, and the like. The power supply may be a battery. The power management component is configured to manage charging of the power supply and power supplying to another module performed by the power supply. A charging management module is configured to receive a charging input from a charger. The power management module is configured to connect to the power supply, the charging management module, and the processor 110.

The mobile communication module 130 may include but is not limited to an antenna, a power amplifier, a filter, a low noise amplifier (Low Noise Amplify, LNA), and the like. The mobile communication module 130 can provide a solution, applied to the mobile phone 100, to wireless communication including 2G, 3G, 4G, 5G, and the like. The mobile communication module 130 may receive an electromagnetic wave through the antenna, perform processing such as filtering or amplification on the received electromagnetic wave, and transmit the electromagnetic wave to the modem processor for demodulation. The mobile communication module 130 may further amplify a signal modulated by the modem processor, and convert the amplified signal into an electromagnetic wave for radiation through the antenna. In some embodiments, at least some functional modules of the mobile communication module 130 may be disposed in the processor 110. In some embodiments, at least some functional modules of the mobile communication module 130 and at least some modules of the processor no may be disposed in a same component.

The wireless communication module 120 may include an antenna, and transmit and receive an electromagnetic wave by using the antenna. The wireless communication module 120 may provide a wireless communication solution that is applied to the mobile phone 100 and that includes a wireless local area network (Wireless Local Area Networks, WLAN) (for example, a wireless fidelity (Wireless Fidelity, Wi-Fi) network), Bluetooth (Bluetooth, BT), a global navigation satellite system (Global Navigation Satellite System, GNSS), frequency modulation (Frequency Modulation, FM), a near field communication technology (Near Field Communication, NFC), an infrared technology (Infrared, IR), and the like. In some embodiments of this application, the mobile phone 100 may communicate with the smart door lock 200 by using a wireless communication technology.

In some embodiments, the mobile communication module 130 and the wireless communication module 120 that are of the mobile phone 100 may alternatively be located in a same module.

The camera 170 is configured to capture a static image or a video. An object generates, through a lens, an optical image to be projected to a photosensitive element. The photosensitive element converts an optical signal into an electrical signal, and then transmits the electrical signal to an ISP (Image Signal Processor, image signal processor) to convert the electrical signal into a digital image signal. The mobile phone 100 may implement a shooting function by using the ISP, the camera 170, a video codec, the GPU (Graphics Processing Unit, graphics processing unit), the display 102, an application processor, and the like.

The display 102 includes a display panel. The display panel may be a liquid crystal display (Liquid Crystal Display, LCD), an organic light-emitting diode (Organic Light-emitting Diode, OLED), an active-matrix organic light-emitting diode (Active-matrix Organic Light-emitting Diode, AMOLED), a flexible light-emitting diode (Flex Light-emitting Diode, FLED), a mini-LED, a micro-LED, a micro-OLED, a quantum dot light-emitting diode (Quantum Dot Light-emitting Diodes, QLED), or the like. For example, the display 102 is configured to display a preview image of a face, a text prompt and a picture prompt for prompting the user to adjust a position and a posture of a face, and a symbol prompt and a text prompt for prompting the user that the face is successfully registered.

The sensor module 190 may include an optical proximity sensor, a pressure sensor, a gyroscope sensor, a barometric pressure sensor, a magnetic sensor, an acceleration sensor, a distance sensor, a fingerprint sensor, a temperature sensor, a touch sensor, an ambient light sensor, a bone conduction sensor, and the like.

The audio module 150 is configured to convert digital audio information into an analog audio signal output, or convert an analog audio input into a digital audio signal. The audio module 150 may be further configured to encode and decode an audio signal. In some embodiments, the audio module 150 may be disposed in the processor 110, or some functional modules in the audio module 150 are disposed in the processor 110. In some embodiments, the audio module 150 may include a speaker, an earpiece, a microphone, and a headset jack. For example, in some embodiments of this application, the audio module 150 is configured to play voice prompt information of the mobile phone 100, to prompt the user with voice prompt messages such as "Raise your head", "Lower your head", "Turn your face to the left", "Turn your face to the right", and "Registration successful".

The interface module 160 includes an external memory interface, a universal serial bus (Universal Serial Bus, USB) interface, a subscriber identity module (Subscriber Identification Module, SIM) card interface, and the like. The external memory interface may be configured to connect to an external storage card, for example, a micro SD card, to extend a storage capability of the mobile phone 100. The external memory card communicates with the processor 110 through the external memory interface, to implement a data storage function. The universal serial bus interface is used for communication between the mobile phone 100 and another mobile phone. The subscriber identity module card interface is configured to communicate with a SIM card installed in the mobile phone 100, for example, read a phone number stored in the SIM card, or write a phone number into the SIM card.

In some embodiments, the mobile phone 100 further includes a button, a motor, an indicator, and the like. The button may include a volume button, a power button, and the like. The motor is configured to enable the mobile phone 100 to generate a vibration effect. For example, the motor vibrates when the mobile phone 100 of the user is successfully connected to the smart door lock 200, or may vibrate when the smart door lock 200 completes face registration, to prompt the user that the face is successfully registered. The indicator may include a laser indicator, a radio frequency indicator, an LED indicator, and the like.

Embodiments of a mechanism disclosed in this application may be implemented in hardware, software, firmware, or a combination of these implementation methods. Embodiments of this application may be implemented as a computer program or program code executed in a programmable system. The programmable system includes at least one processor, a storage system (including a volatile memory, a nonvolatile memory, and/or a storage element), at least one input device, and at least one output device.

The program code may be configured to input instructions, to perform functions described in this application and generate output information. The output information may be applied to one or more output devices in a known manner. For a purpose of this application, a processing system includes any system that has a processor such as a digital signal processor (Digital Signal Processor, DSP), a microcontroller, an application-specific integrated circuit (Application-Specific Integrated Circuit, ASIC), or a microprocessor.

The program code may be implemented in a high-level procedural language or an object-oriented programming language, to communicate with the processing system. The program code may alternatively be implemented by using an assembly language or a machine language when needed. Actually, the mechanisms described in this application are not limited to a scope of any particular programming language. In any case, the language may be a compiled language or an interpretive language.

In some cases, the disclosed embodiments may be implemented by hardware, firmware, software, or any combination thereof. The disclosed embodiments may be alternatively implemented by using instructions carried by or stored on one or more temporary or non-temporary machine-readable (for example, computer-readable) storage media, and the instructions may be read and executed by one or more processors. For example, the instructions may be distributed through a network or another computer-readable medium. Therefore, the machine-readable medium may include any mechanism for storing or transmitting information in a machine-readable (for example, computer-readable) form. The machine-readable medium includes but is not limited to a floppy disk, a compact disc, an optical disc, a read-only memory (CD-ROMs), a magneto-optical disc, a read-only memory (Read Only Memory, ROM), a random access memory (Random Access Memory, RAM), an erasable programmable read-only memory (Erasable Programmable Read Only Memory, EPROM), an electrically erasable programmable read-only memory (Electrically Erasable Programmable Read-Only Memory, EEPROM), a magnetic card, an optical card, a flash memory, or a tangible machine-readable memory configured to transmit information (for example, a carrier, an infrared signal, or a digital signal) by using a propagating signal in an electrical, optical, acoustic, or another form over the Internet. Therefore, the machine-readable medium includes any type of machine-readable medium that is suitable for storing or transmitting electronic instructions or information in a machine-readable (for example, computer-readable) form.

In the accompanying drawings, some structural or method features may be shown in a particular arrangement and/or order. However, it should be understood that such a particular arrangement and/or order may not be needed. In some embodiments, these features may be arranged in a manner and/or order different from those/that shown in the descriptive accompanying drawings. In addition, inclusion of the structural or method features in a particular figure does not imply that such features are needed in all embodiments, and in some embodiments, these features may not be included or may be combined with other features.

It should be noted that all units/modules mentioned in the device embodiments of this application are logical units/modules. Physically, one logical unit/module may be one physical unit/module, may be a part of one physical unit/module, or may be implemented by using a combination of a plurality of physical units/modules. Physical implementations of these logical units/modules are not the most important, and a combination of functions implemented by these logical units/modules is a key to resolving technical issues proposed in this application. In addition, to highlight an innovative part of this application, a unit/module that is not closely related to resolving the technical issues proposed in this application is not introduced in the foregoing device embodiments of this application. This does not mean that there are no other units/modules in the foregoing device embodiments.

It should be noted that in the examples and the specification of this patent, relational terms such as first and second are used only to differentiate an entity or operation from another entity or operation, and do not require or imply that any actual relationship or sequence exists between these entities or operations. Moreover, a term "include", "comprise", or any other variant is intended to encompass a non-exclusive inclusion, so that a process, a method, an article, or a device that includes a series of elements not only includes those elements, but also includes other elements not explicitly listed, or further includes elements inherent to such a process, method, article, or device. An element preceded by a statement "includes a" does not, without more constraints, preclude the presence of additional identical elements in the process, method, article, or device that includes the element.

Although this application has been illustrated and described with reference to some embodiments of this application, a person of ordinary skill in the art should understand that various changes may be made to this application in form and detail without departing from the scope of this application.

What is claimed is:

1. A method, applied to a system comprising a first electronic device and a second electronic device, wherein the first electronic device comprises a first camera and a second camera, there is an image mapping relationship between the first camera and the second camera, and the method comprises:
 obtaining, by the first electronic device, a first face image acquired by the first camera at a first moment, wherein a face in the first face image is at a first position of the first face image; and
 displaying, by the second electronic device, a second face image, wherein the second face image is obtained by converting the first face image based on the image mapping relationship, and a position of the face in the second face image is the same as a position of the face in an image acquired by the second camera at the first moment.

2. The method according to claim 1, wherein:
 the image mapping relationship is a mapping relationship between a first camera image coordinate system and a second camera image coordinate system;
 the first camera image coordinate system is a two-dimensional coordinate system associated with the first camera; and
 the second camera image coordinate system is a two-dimensional coordinate system associated with the second camera.

3. The method according to claim 2, wherein:
 the image mapping relationship is a preset parameter; or
 the image mapping relationship is determined by the first electronic device or the second electronic device based on a first mapping relationship, a second mapping relationship, and a third mapping relationship, wherein
 the first mapping relationship is a mapping relationship between a first camera space coordinate system and a second camera space coordinate system, the first camera space coordinate system is a three-dimensional coordinate system associated with the first camera, and the second camera space coordinate system is a three-dimensional coordinate system associated with the second camera,
 the second mapping relationship is a mapping relationship between the first camera space coordinate system and the first camera image coordinate system, and
 the third mapping relationship is a mapping relationship between the second camera space coordinate system and the second camera image coordinate system.

4. The method according to claim 1, wherein the method further comprises:
 receiving, by the second electronic device, the first face image sent by the first electronic device, and processing the first face image based on the image mapping relationship to obtain the second face image; or
 receiving, by the second electronic device, the second face image sent by the first electronic device.

5. The method according to claim 1, wherein the first electronic device or the second electronic device obtains the image mapping relationship by using an application program associated with the first electronic device.

6. The method according to claim 1, wherein the method further comprises:
 displaying, by the second electronic device, first prompt information for prompting a user to adjust a position of the face.

7. The method according to claim 6, wherein the method further comprises:
 in response to the position of the face being close to a central position of the second face image in the second face image displayed by the second electronic device, skipping, by the second electronic device, displaying the first prompt information.

8. The method according to claim 6, wherein the method further comprises:
 displaying, by the second electronic device, second prompt information for prompting the user to adjust an orientation of the face.

9. The method according to claim 8, wherein:
 the first prompt information is generated based on the second face image; or
 the second prompt information is generated based on the second face image.

10. The method according to claim 1, wherein a field of view of the first camera is greater than a field of view of the second camera.

11. The method according to claim 1, wherein:
 the first camera is either a cat-eye camera or a fisheye camera;
 the second camera is one of a TOF camera, a structured light camera, a binocular stereoscopic imaging camera, a depth camera, or an infrared camera; and
 the second camera is configured to acquire depth information of an image.

12. The method according to claim 1, wherein the first electronic device is a smart door lock, and the second electronic device is a mobile phone.

13. A method, applied to a second electronic device, the method comprising:
 displaying a second face image, wherein the second face image is an image obtained by converting a first face image based on an image mapping relationship, the image mapping relationship is a mapping relationship between an image acquired by a first camera and an image acquired by a second camera, the first camera and the second camera are comprised in a first electronic device different from the second electronic device, the first face image is an image acquired by the first camera at a first moment, a face in the first face image is at a first position of the first face image, and a position of the face in the second face image is the same as a position of the face in an image acquired by the second camera at the first moment.

14. The method according to claim 13, wherein the second electronic device obtains the image mapping relationship using an application program associated with the first electronic device.

15. The method according to claim 13, wherein the method further comprises:
 displaying first prompt information for prompting a user to adjust a position of the face; and
 displaying second prompt information for prompting the user to adjust an orientation of the face.

16. The method according to claim 13, wherein:
 the first camera is either a cat-eye camera or a fisheye camera;
 the second camera is one of a TOF camera, a structured light camera, a binocular stereoscopic imaging camera, a depth camera, or an infrared camera; and the second camera is configured to acquire depth information of an image.

17. A method, applied to a first electronic device, wherein the first electronic device comprises a first camera and a second camera, there is an image mapping relationship between the first camera and the second camera, and the method comprises:

obtaining a first face image acquired by the first camera at a first moment, wherein a face in the first face image is at a first position of the first face image, the first face image is used to obtain a second face image through conversion based on the image mapping relationship, a position of the face in the second face image is the same as a position of the face in an image acquired by the second camera at the first moment, and the second face image is used to be displayed in a second electronic device different from the first electronic device.

18. The method according to claim 17, wherein the first electronic device obtains the image mapping relationship using an application program associated with the first electronic device.

19. The method according to claim 17, wherein:

the first camera is either a cat-eye camera or a fisheye camera;

the second camera is one of a TOF camera, a structured light camera, a binocular stereoscopic imaging camera, a depth camera, or an infrared camera; and the second camera is configured to acquire depth information of an image.

20. The method according to claim 17, wherein the first electronic device is a smart door lock.

* * * * *